US012696859B2

(12) United States Patent
Foon et al.

(10) Patent No.: US 12,696,859 B2
(45) Date of Patent: Aug. 4, 2026

(54) PLANT GROWTH APPARATUS AND METHOD OF FORMATION THEREOF

(71) Applicants: Brandon Foon, Rosemead, CA (US);
Edward Tang, Rosemead, CA (US)

(72) Inventors: Brandon Foon, Rosemead, CA (US);
Edward Tang, Rosemead, CA (US)

( * ) Notice: Subject to any disclaimer, the term of this patent is extended or adjusted under 35 U.S.C. 154(b) by 166 days.

(21) Appl. No.: 18/512,407

(22) Filed: Nov. 17, 2023

(65) Prior Publication Data

US 2025/0160273 A1 May 22, 2025

(51) Int. Cl.
*A01G 31/02* (2006.01)

(52) U.S. Cl.
CPC ............ *A01G 31/02* (2013.01); *A01G 31/065* (2025.01)

(58) Field of Classification Search
CPC .. A01G 31/02; A01G 31/023; A01G 31/0231; A01G 31/025; A01G 31/06; A01G 31/065; A01G 9/023; A01G 9/025
See application file for complete search history.

(56) References Cited

U.S. PATENT DOCUMENTS

| | | | |
|---|---|---|---|
| 4,295,296 A | 10/1981 | Kinghorn | |
| 4,953,363 A | * 9/1990 | Primozic | A47F 3/0443 |
| | | | 62/255 |
| 7,516,574 B2 | 4/2009 | Gottlieb et al. | |
| 8,141,294 B2 | 3/2012 | Bribach et al. | |

| | | |
|---|---|---|
| 8,505,238 B2 | 8/2013 | Luebbers et al. |
| 8,578,651 B1 | 11/2013 | Giacomantonio |
| 8,966,819 B1 | 3/2015 | Cosmann |
| 9,015,991 B2 | 4/2015 | Heather |
| 9,226,457 B2 | 1/2016 | Laurence et al. |
| 9,258,948 B2 | 2/2016 | Dos Santos |

(Continued)

FOREIGN PATENT DOCUMENTS

| | | |
|---|---|---|
| AU | 2016208325 B1 | 2/2017 |
| CA | 2820364 A1 | 12/2013 |

(Continued)

OTHER PUBLICATIONS

"Reef-A-Palooza CA 2023 Highlights", Published at Youtube, By Ultum Nature System, Published Online On [Dec. 7, 2023] https://www.youtube.com/watch?v=OdSI3bR30dg&t=35s.

(Continued)

*Primary Examiner* — Son T Nguyen
(74) *Attorney, Agent, or Firm* — LegalForce RAPC Worldwide

(57) ABSTRACT

A plant growth apparatus includes a vapor duct, a plurality of cascade points, a plurality of mounts, a plurality of spill throughs, a reservoir, a water return, and a vaporizer. The vapor duct allows the passage of vapor into a plant enclosure. The plurality of cascade points allows passage of water from a trough. The plants are set into plant receivers of the mounts. The roots of the plant occupy a root space formed by the plant wall and the mounts. The spill throughs are cut into the mounts which allow water to enter the root space and a pool below the mounts. The reservoir fills the trough with water and causes it to flow through the cascade points. The water return connects the pool of the plant enclosure and the reservoir. The vaporizer located partially within the reservoir creates vapor that moves to the plant enclosure.

20 Claims, 21 Drawing Sheets

(56) References Cited

U.S. PATENT DOCUMENTS

| | | | |
|---|---|---|---|
| 9,883,642 | B2 | 2/2018 | Friedman |
| 10,517,230 | B2 | 12/2019 | Law |
| 10,694,684 | B2 | 6/2020 | Järvinen et al. |
| 10,874,065 | B2 | 12/2020 | Mcguinness et al. |
| 11,298,655 | B2 * | 4/2022 | Cavote ................... A01G 9/025 |
| 11,647,708 | B2 | 5/2023 | Langille et al. |
| 11,730,096 | B2 | 8/2023 | Wantland et al. |
| 11,758,859 | B2 | 9/2023 | Howe |
| 11,825,786 | B2 | 11/2023 | Allgeier et al. |
| 2003/0150394 | A1 | 8/2003 | Wolfe |
| 2009/0223126 | A1 | 9/2009 | Garner et al. |
| 2011/0215937 | A1 | 9/2011 | Carroll et al. |
| 2011/0258925 | A1 | 10/2011 | Baker |
| 2012/0066972 | A1 | 3/2012 | Lin |
| 2013/0160363 | A1 | 6/2013 | Whitney et al. |
| 2013/0227884 | A1 | 9/2013 | Park et al. |
| 2014/0318011 | A1 * | 10/2014 | Jarvinen ................ A01G 9/241 |
| | | | 47/79 |
| 2016/0037733 | A1 | 2/2016 | Baker et al. |
| 2016/0066525 | A1 | 3/2016 | Duquesnay et al. |
| 2017/0202164 | A1 * | 7/2017 | Dufresne ............... A01G 31/02 |
| 2018/0014484 | A1 | 1/2018 | Yoshida |
| 2018/0295800 | A1 | 10/2018 | Kiernan |
| 2019/0321779 | A1 * | 10/2019 | Ristvey .................. A01G 31/00 |
| 2020/0029508 | A1 | 1/2020 | Vazquez Losada |
| 2020/0323154 | A1 * | 10/2020 | Benner .................. A01G 22/30 |
| 2021/0015054 | A1 | 1/2021 | Homsri |
| 2022/0330504 | A1 * | 10/2022 | Langille ................ A01G 31/06 |

FOREIGN PATENT DOCUMENTS

| | | | |
|---|---|---|---|
| CN | 104343196 | A | 2/2015 |
| CN | 110089306 | A | 8/2019 |
| EP | 2885963 | A1 | 6/2015 |
| KR | 100858993 | B1 * | 9/2008 |
| KR | 200449415 | Y1 | 7/2010 |
| KR | 101074931 | B1 | 10/2011 |
| KR | 20140019983 | A | 2/2014 |
| KR | 101485824 | B1 | 1/2015 |
| KR | 20180000548 | U * | 2/2018 |
| KR | 20190137201 | A | 12/2019 |
| KR | 20190140127 | A | 12/2019 |
| KR | 102103923 | B1 | 4/2020 |
| KR | 102556253 | B1 | 7/2023 |
| KR | 102626532 | B1 | 1/2024 |
| WO | 2010089429 | A1 | 8/2010 |

OTHER PUBLICATIONS

"Vertical Garden—An Innovative Technology for Green Building", Published at Agri Food Magzine, by Kavana G. B et al., Published In [May 2022] https://www.researchgate.net/publication/360318357_ Vertical_Garden_-An_Innovative_Technology_for_Green_ Building.

"Effects of Green Plants on the Indoor Environment and Wellbeing in Classrooms—A Case Study in a Swedish School", Published at The Innovation Thinking of Urban Green on Human Health, by Itai Danielski et al., Published Online on [Mar. 23, 2022] https://www. mdpi.com/2071-1050/14/7/3777.

"Vertical and rooftop Gardens", Published at Northern Illinois University, by Evan Randolph, Found Online On [Feb. 14, 2024] https://www.niu.edu/communiversitygardens/_pdf/projects/Vertical-Rooftop-Gardens.pdf.

"What are Green Walls—the Definition, Benefits, Design, and Greenery", Published at NAAVA, Published Online On [Jul. 24, 2017] https://www.naava.io/editorial/what-are-green-walls.

"Vertical Gardens—An Innovative Element of Green Building Technology", Published at Amity University, by Piyush Mishra, Found Online On [Feb. 15, 2024] https://www.scribd.com/document/ 392998940/7-Piyush-Sharma-Vertical-Gardens-Pp-42-48.

"Vertical Greening Systems: A Critical Comparison of Do-It-Yourself Designs", Published at Ornamental Plants and Urban Gardening, by Laura Dominici et al., Published Online on [Nov. 25, 2022] https://www.mdpi.com/2223-7747/11/23/3230.

* cited by examiner

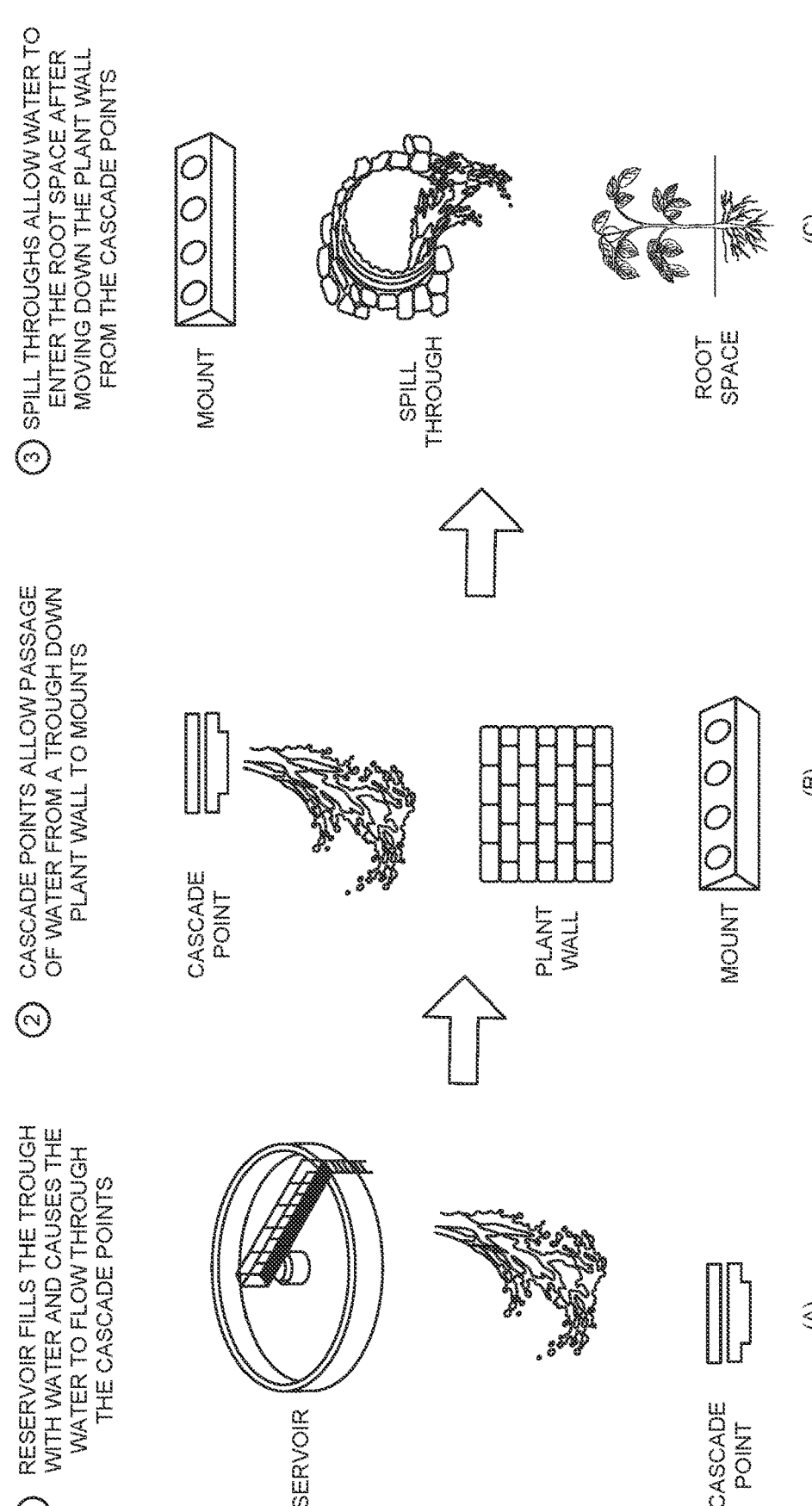

① RESERVOIR FILLS THE TROUGH WITH WATER AND CAUSES THE WATER TO FLOW THROUGH THE CASCADE POINTS

RESERVOIR

CASCADE POINT (A)

② CASCADE POINTS ALLOW PASSAGE OF WATER FROM A TROUGH DOWN PLANT WALL TO MOUNTS

CASCADE POINT

PLANT WALL

MOUNT (B)

③ SPILL THROUGHS ALLOW WATER TO ENTER THE ROOT SPACE AFTER MOVING DOWN THE PLANT WALL FROM THE CASCADE POINTS

MOUNT

SPILL THROUGH

ROOT SPACE (C)

FIG. 14

① SPILL THROUGHS ALLOW FOR A PORTION OF THE WATER TO MOVE TO THE POOL

② A WATER RETURN CONNECTS THE POOL AND THE RESERVOIR AND ALLOWS WATER TO MOVE FROM THE POOL BACK INTO THE RESERVOIR VIA A PUMP

③ VAPORIZER CREATES VAPOR FROM THE WATER IN THE RESERVOIR AND MOVES THE VAPOR TO THE PLANT ENCLOSURE

SPILL THROUGH

POOL (A)

POOL

PUMP

RESERVOIR (B)

VAPORIZER

PLANT (C)

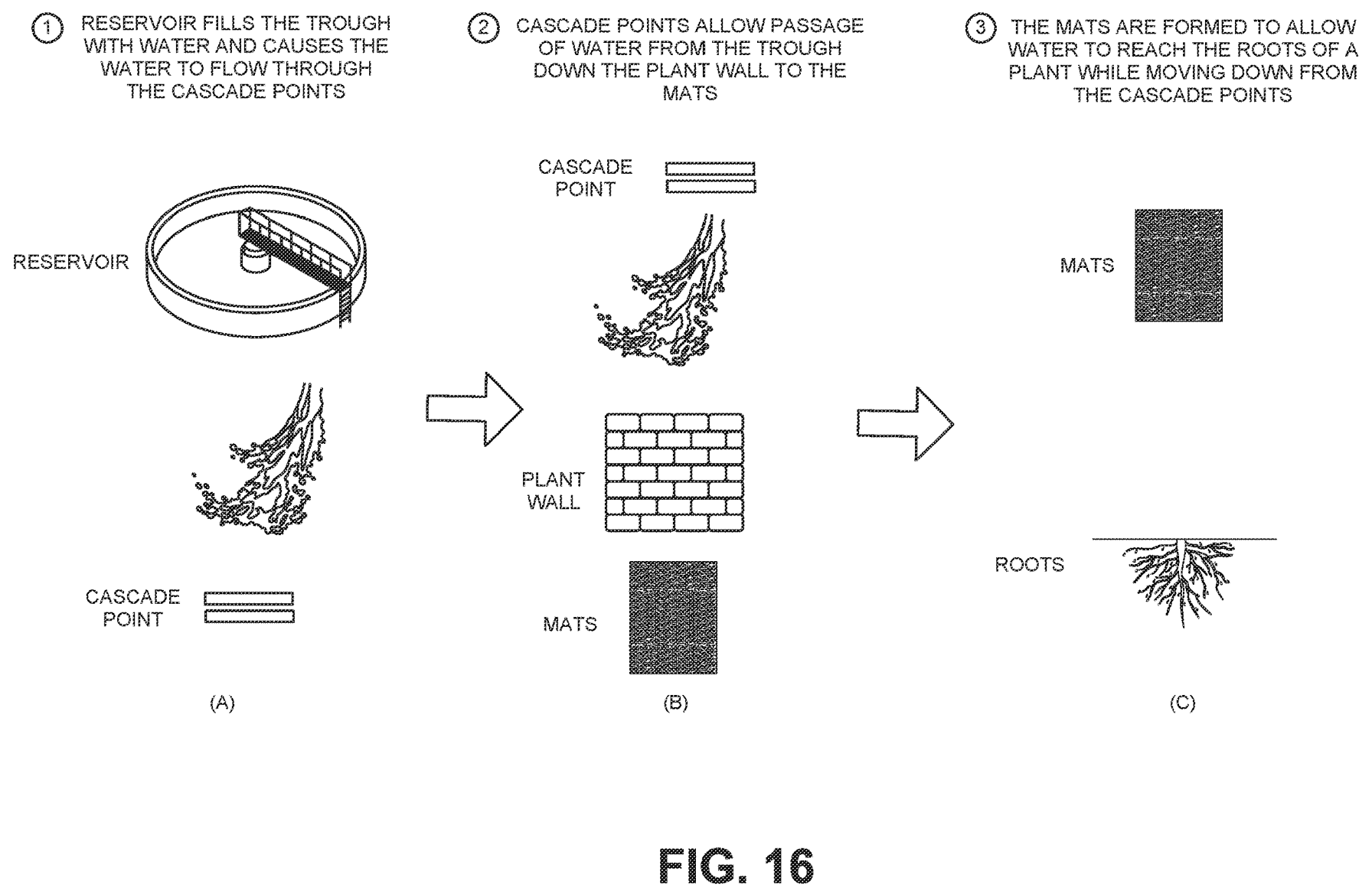

① RESERVOIR FILLS THE TROUGH WITH WATER AND CAUSES THE WATER TO FLOW THROUGH THE CASCADE POINTS

RESERVOIR

CASCADE POINT (A)

② CASCADE POINTS ALLOW PASSAGE OF WATER FROM THE TROUGH DOWN THE PLANT WALL TO THE MATS

CASCADE POINT

PLANT WALL

MATS (B)

③ THE MATS ARE FORMED TO ALLOW WATER TO REACH THE ROOTS OF A PLANT WHILE MOVING DOWN FROM THE CASCADE POINTS

MATS

ROOTS (C)

FIG. 16

① MATS ALLOW FOR A PORTION OF THE WATER TO MOVE TO THE POOL

MATS

POOL (A)

② A WATER RETURN CONNECTS THE POOL AND THE RESERVOIR AND ALLOWS WATER TO MOVE FROM THE POOL BACK INTO THE RESERVOIR VIA A PUMP

POOL

PUMP

RESERVOIR (B)

③ VAPORIZER CREATES VAPOR FROM THE WATER IN THE RESERVOIR AND MOVES THE VAPOR TO THE PLANT ENCLOSURE

VAPORIZER

PLANT (C)

PLANT GROWTH APPARATUS AND METHOD OF FORMATION THEREOF

FIELD OF TECHNOLOGY

This disclosure relates generally to the field of plant growth apparatuses and associated methods of formation are described, and more particularly to a plant growth apparatus in the form of a paludarium, and its associated methods of formation.

BACKGROUND

A plant growth apparatus may be used commercially to grow plants for hobbyists, educational institutions, research purposes, decorative purposes, and/or conservation purposes. The plant growth apparatus may be used for hobby and/and decorative purposes. For example, the plant growth apparatus may be used non-commercially by gardening enthusiasts and/or educational institutions to form a microenvironment to foster plant growth despite an incompatible ambient environment. In addition, the plant growth apparatus may be used non-commercially to add visual beauty and/or interior design to one's home, business, and/or office.

The plant growth apparatus may be bulky and/or inefficient. The plant growth apparatus may utilize either a stair-step like configuration wherein plants are placed within the stair-case like mounts. The stair-case configurations may cause the apparatus to have a large footprint, taking up large amounts of valuable growing space. Stair-case mounts may also limit the available means of watering. Stair-case like mounts may require for continuous root soaking and/or continuous root exposure, but the plant growth apparatus may not allow for simultaneous root soaking and/or root exposure.

Unfortunately, aquatic and/or semi-aquatic plants may die in the plant growth apparatus because they may be overwatered with continuous root soaking and/or underwatered continuous root exposure. Similarly, the plant growth apparatus in an aquarium configuration may submerge entire plants and may create a large footprint because plants may not be stacked, and if they are stacked within the aquarium, the health and quality of the plants may deteriorate resulting in the need for more filtration and/or more maintenance for the aquarium system. The large footprint of the plant growth apparatus may pose numerous problems. Users may not have the space within their residence and/or business to house the plant growth apparatus, and if they do, the plant growth apparatus may be bulky and heavy, thus making moving the plant growth apparatus difficult. The large footprint of the plant growth apparatus may further pose a tripping hazard, cause aesthetic disruptions, cause deterioration of flooring, require an immense amount of energy consumption, be susceptible to breaking/malfunctioning, and/or pose challenges when attempting to clean the plant growth apparatus.

Therefore, the plant growth apparatus may be inefficient and specialized to grow only one sub-category of plants (e.g. aquatic, semi-aquatic, and/or terrestrial). The plant growth apparatus may use excessive water which may lead to increased costs for growers. Plant growth apparatus may also lack environmental efficiency as the mildew unintentionally grown therein may spoil otherwise healthy plants and the mildew may infest the entirety of the apparatus. Furthermore, the plant growth apparatus may have problems maintaining humidity, problems regulating temperature, water quality problems, aesthetic challenges, and/or space and growth limitations such as poor root binding and overall size constraints. Together, these issues may lead to plant health issues including plant disease, pest infestations, and/or nutrient deficiencies.

SUMMARY

Disclosed is a system of plant growth apparatus and a method of formation thereof. In one aspect, a plant growth apparatus includes a vapor duct, a plurality of cascade points, a plurality of mounts, a plurality of spill throughs, a reservoir, a water return, and a vaporizer. The vapor duct is formed through a plant wall to allow the passage of vapor into a plant enclosure. The vapor duct is situated at a top portion of the plant wall. The plant wall, a right wall, a left wall, and a front wall forms the plant enclosure. The plurality of cascade points are perforated into the plant wall to allow passage of water from a trough located behind the cascade points of the plant wall. The cascade points are positioned below the vapor duct. The plurality of mounts are attached to the plant wall. The plurality of mounts include a plurality of plant receivers. Plants are set into the plurality of plant receivers of the mounts and the roots of the plants occupy a root space formed by the plant wall and the mounts.

The plurality of spill throughs are cut into the plurality of mounts. The plurality of spill throughs allow water to enter the root space after moving down along the plant wall from the cascade points. The plurality of spill throughs allow for a portion of the water to move to a pool below the plurality of mounts. The reservoir behind the plant wall is formed from a reservoir wall, a rear wall, the left wall, and the right wall of the plant enclosure. The trough is situated between the plant wall and the reservoir wall. The reservoir is located behind the trough. The reservoir fills the trough with water by spilling water over the reservoir wall into the trough which causes the water to flow through the cascade points.

An interchamber space is situated between the plant enclosure and the reservoir. The interchamber space is formed from the left wall, the right wall, a back of the plant wall, a front of the reservoir wall, and a bottom of the trough. The trough is attached to at least one of the back of the plant wall and the front of the reservoir wall The water return connects the pool of the plant enclosure and the reservoir. The water return allows water to move from the pool back into the reservoir via a pump. The vaporizer is located at least partially within the reservoir. The vaporizer creates vapor from the water in the reservoir and the vapor moves through the vapor duct to the plant enclosure.

The pool may be formed from a base, the left wall, the right wall, the rear wall, and/or a front wall of the plant enclosure. The trough may be attached to the back of the plant wall below a top of the reservoir wall. The trough may be attached to the back of the plant wall at the top of the reservoir wall. At least one divider may be located in the reservoir. The divider may create at least two chambers within the reservoir. The two chambers within the reservoir may be implanted with a filtration media. The plurality of mounts may be oriented against the plant wall at an angle between 10 degrees and/or 70 degrees. A plurality of apertures may be cut into the plant wall adjacent to the root space of the mounts and/or the plurality of plant receivers. The plurality of apertures may receive a bottom portion of the plant.

The apertures may be formed in an oval shape. The plurality of cascade points may include an upper slit and a lower slit. The upper slit may be an opening in the plant wall above the mounts that is longer in a width than a height. The lower slit may be an opening in the plant wall that is longer in width than the height. The lower slit may be located above the plurality of mounts and/or below the upper slit. The lower slits may include a curved notch on a bottom edge of the lower slit.

An internal filter may be within the interchamber space and/or may include the pump. The pump may move water from the pool to the filter via a first pipe and further may move the filtered water through a second pipe into a top of the reservoir. The plant growth apparatus may include a second pool formed from the left wall, the right wall, the reservoir wall, and a partition. The second pool may be elevated above the pool. The partition may separate the second pool from the pool. At least one drainage point of the partition may include a filtration screen to filter water draining from the second pool into the pool. The plant growth apparatus may include at least one pool stand. The pool stand may include a leg and a plurality of second plant receivers. The pool stand may allow the plant to be at least partially submerged within the pool when in the second plant receiver.

In another aspect, a plant growth apparatus includes a plant enclosure, plurality of vapor ducts, a plurality of cascade points, a plurality of mounts, a plurality of spill throughs, a reservoir, an interchamber space, a water return, a vaporizer, at least one pool stand, and plurality of apertures. The plant enclosure is formed from a plant wall, a left wall, a right wall, and a front wall. The plurality of vapor ducts are formed through the plant wall to allow the passage of vapor into the plant enclosure. The vapor ducts are longer in a width than a height. The plurality of cascade points are perforated into the plant wall to allow passage of water from a trough located behind the cascade points of the plant wall. The plurality of cascade points includes a plurality of upper slits and a plurality of lower slits. The upper slits and the lower slits are longer in the width than the height. The lower slits include a curved notch on a bottom edge of the lower slit.

The plurality of mounts are horizontally attached to the plant wall and include a plurality of plant receivers. The plants are inserted into the plant receivers at an angle between 10 degree and 75 degrees. The plurality of spill throughs are cut into the plurality of mounts. The plurality of spill throughs allow water to enter a root space of the plurality of mounts. The plurality of spill throughs are longer in the width than the height. The reservoir is formed from a reservoir wall, a rear wall, the left wall, and the right wall of the plant enclosure. The reservoir fills the trough with water and causes the water to flow through the cascade points. The water flows from the cascade points down the plant wall and through the spill throughs into a pool. The pool is formed from the left wall, the right wall, the plant wall, and the front wall of the plant enclosure. The reservoir is divided into a left side, a middle, and a right side by a divider and a second divider.

The interchamber space is formed from the left wall, the right wall, a back of the plant wall, a front of reservoir wall, and a bottom of the trough. The trough is attached to the back of the plant wall and the front of the reservoir wall. The trough is below a top of the reservoir wall. The water return connects the pool of the plant enclosure and the reservoir. The water return allows water to move from the pool back into the reservoir via a pump. The pump moves water from the pool to a filtration system located in the interchamber space through a first pipe. The pump moves cleaned water from the filtration system through a second pipe to a top of the reservoir. The vaporizer is located at least partially within the reservoir. The vaporizer creates vapor from the water in the reservoir and the vapor moves through the vapor ducts to the plant enclosure.

A second pool is formed from the left wall, the right wall, the reservoir wall, and a partition. The second pool is elevated above the pool. The partition separates the second pool from the pool. The partition includes at least one drainage point. The drainage point includes a filtration screen to filter water draining from the second pool into the pool. The pool stand is within the pool and includes at least two legs and a plurality of second plant receivers. The pool stand allows a plant plant to be at least partially submerged within the pool when in the second plant receiver.

The plurality of apertures are cut into the plant wall adjacent to the root space of the mounts and the plurality of plant receivers. The plurality of apertures receive a bottom portion of the plant. The bottom portion of the plant extends into the interchamber space. The apertures are oval shaped. The vaporizer may be partially in the left side of the reservoir, the right side of the reservoir, and/or the middle of the reservoir. A filtration media may be implanted in the left side of the reservoir, the right side of the reservoir, and/or the middle of the reservoir.

In yet another aspect, a plant growth apparatus includes a plant enclosure, a vapor duct, a plurality of cascade points, a plurality of mat racks, a reservoir, an interchamber space, a water return, and a vaporizer. The plant enclosure is formed from a plant wall, a left wall, a right wall, and a front wall. The vapor duct is formed through the plant wall to allow the passage of vapor into the plant enclosure. The vapor duct is longer in a width than a height. The plurality of cascade points are perforated into the plant wall to allow passage of water from a trough located behind the cascade points of the plant wall. The plurality of cascade points includes a plurality of upper slits and a plurality of lower slits. The upper slits are longer in the width than the height and the lower slits are longer in width than the height. The plurality of mat racks are attached to the plant wall. Each mat rack of the plurality of mat racks supports at least one mat against the plant wall.

The reservoir is formed from a reservoir wall, a rear wall, the left wall, and the right wall. The reservoir fills the trough with water and causes the water to flow through the cascade points. The water flows from the cascade points down along the plant wall. The water flows down the plant wall into a pool. The pool is formed from the left wall, the right wall, the plant wall, and the front wall of the plant enclosure. The reservoir is divided into a left side, a middle, and a right side by a divider and a second divider.

The interchamber space is formed from the left wall, the right wall, a back of the plant wall, a front of reservoir wall, and a bottom of the trough. The trough is attached to the back of the plant wall and the front of the reservoir wall. The trough is below a top of the reservoir wall. The water return connects the pool of the plant enclosure and the reservoir. The water return allows water to move from the pool back into the reservoir via a pump. The pump moves water from the pool to a filtration system located in the interchamber space through a first pipe. The pump moves cleaned water from the filtration system through a second pipe to a top of the reservoir. The vaporizer is located at least partially within the reservoir. The vaporizer creates vapor from the water in the reservoir. The vapor moves through the vapor ducts to the plant enclosure.

In yet another aspect, a method of forming a plant growth apparatus includes forming a vapor duct through a plant wall to allow the passage of vapor into a plant enclosure. The vapor duct is situated at a top portion of the plant wall. The plant wall, a right wall, a left wall, and a front wall forms the plant enclosure. The method then perforates a plurality of cascade points into the plant wall to allow passage of water from a trough located behind the cascade points of the plant wall. The cascade points are positioned below the vapor duct. The method then attaches a plurality of mounts to the plant wall. A plurality of plant receivers are cut into the plurality of mounts forming a root space and plants are set into the plurality of plant receivers of the mounts. Roots of the plants occupy the root space formed by the plant wall and the mounts.

The method then cuts a plurality of spill throughs into the plurality of mounts. The plurality of spill throughs allow water to enter the root space after moving down along the plant wall from the cascade points. The plurality of spill throughs allow for a portion of the water to move to a pool below the plurality of mounts. The method then forms a reservoir behind the plant wall from a reservoir wall, a rear wall, the left wall, and the right wall. The trough is situated between the plant wall and the reservoir wall and the reservoir is located behind the trough. The reservoir fills the trough with water by spilling water over the reservoir wall into the trough causing the water to flow through the cascade points.

The method then situates an interchamber space between the plant enclosure and the reservoir. The interchamber space is formed from the left wall, the right wall, a back of the plant wall, a front of the reservoir wall, and a bottom of the trough. The trough is attached to at least one of the back of the plant wall and the front of the reservoir wall. The method then connects the pool of the plant enclosure and the reservoir with a water return. The water return allows water to move from the pool back into the reservoir via a pump. The method then places a vaporizer at least partially within the reservoir. The vaporizer creates vapor from the water in the reservoir, and the vapor moves through the vapor duct to the plant enclosure. The method may implant a filtration media into the reservoir to filter water as it is returned into the reservoir from the pool via the pump.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 14 is a representative view of the water cycle of the plant growth apparatuses of FIGS. 1-9, according to one embodiment.

FIG. 16 is a representative view of the water cycle of the plant growth apparatus of FIGS. 10-13, according to one embodiment.

Other features of the present embodiments will be apparent from the accompanying drawings and from the detailed description that follows.

DETAILED DESCRIPTION

Plant growth apparatuses and associated methods of use are described, and more particularly to a plant growth apparatus in the form of a paludarium, and its associated methods of use.

Figure 1A:
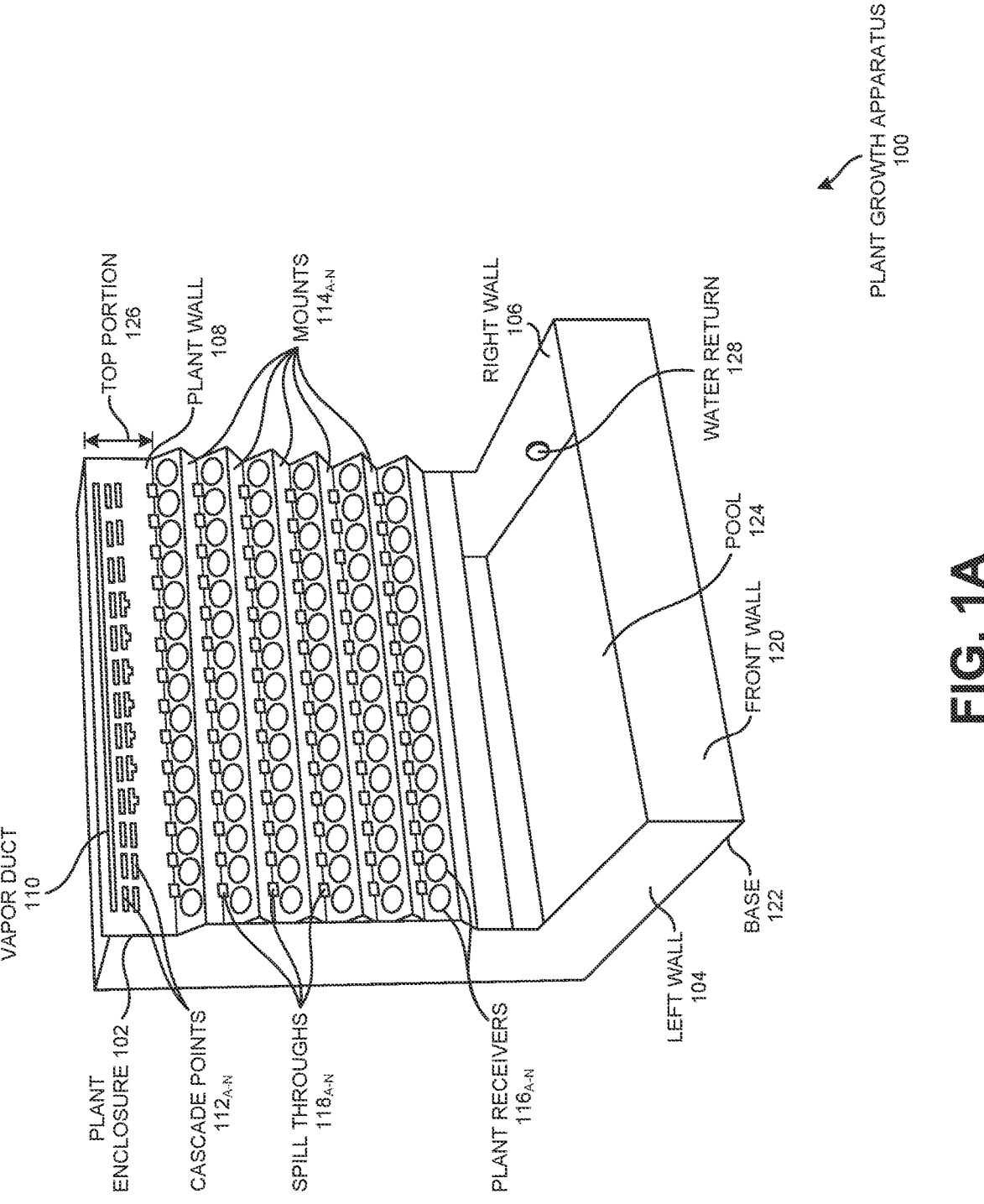
FIG. 1A is a schematic view of the plant growth apparatus illustrating the functional components of the plant growth apparatus, according to one embodiment.

FIG. 1A is a schematic view of the plant growth apparatus 100 illustrating the functional components of the plant growth apparatus 100, according to one embodiment.

FIG. 1A illustrates the plant growth apparatus 100 comprising a plant enclosure 102, a left wall 104, a right wall 106, a plant wall 108, a vapor duct 110, a cascade points 112$_{A-N}$, a mounts 114$_{A-N}$, a plant receivers 116$_{A-N}$, a spill throughs 118$_{A-N}$, a front wall 120, a base 122, a pool 124, a top portion 126 of the plant wall 108, and a water return 128, according to one embodiment.

The plant enclosure 102 may be a front portion of the plant growth apparatus 100 where plants are placed for growth, storage, maintenance, and/or washing. The left wall 104 may be a left portion of the plant growth apparatus 100 that may form the left side of the pool 124 and may be the left enclosing portion for a interchamber space 404 (not shown), a trough 204 (not shown) and/or a reservoir 202 (not shown). The right wall 106 may be a right portion of the plant growth apparatus 100 that may form the right side of the pool 124 and may be the right enclosing portion for the interchamber space 404 (not shown), the trough 204 (not shown) and/or the reservoir 202 (not shown). The plant wall 108 may be the rear most portion of the plant enclosure 102 where the vapor duct 110, the cascade points 112$_{A-N}$ are cut and where the mounts 114$_{A-N}$ are attached.

The vapor duct 110 may be a slit in the plant wall 108 wherein vapor from the vaporizer 210 (not shown) enters into the plant enclosure 102. The cascade points 112$_{A-N}$ may be one or more openings above the mounts 114$_{A-N}$ but below the vapor duct 110 in which water from the trough 204 (not shown) enters the plant enclosure 102 and cascades down the plant wall 108. The mounts 114$_{A-N}$ may be hardscape features and/or structures designed to hold and display plants at an angle and/or in a sloped position within the plant enclosure 102. The plant receivers 116$_{A-N}$ may be openings in the mounts 114$_{A-N}$ where plants, potted plants, bagged plants, and/or basket potted plants may be placed. The spill throughs 118$_{A-N}$ may be openings in the mounts 114$_{A-N}$ and/or plant wall 108 that may allow water running down the plant wall 108 from the cascade points 112$_{A-N}$ to enter a root space 402 and eventually reach the pool 124.

The front wall 120 may be the front portion of the pool 124 and may vary in height. The front wall 120 may be partially removable and/or include doors or portals for access. The base 122 may be the bottom of the plant enclosure 102, the pool 124, the interchamber space 404 (not shown), and/or the reservoir 202. The pool 124 may be the bottom most portion of the plant enclosure 102 and may be formed from the base 122, the front wall 120, the left wall 104, the right wall 106, the plant wall 108, and/or the reservoir wall 206 (not shown). The top portion 126 of the plant wall 108 may be the area of the plant wall 108 above the mounts 114$_{A-N}$ and may comprise the vapor duct 110 and/or the cascade points 112$_{A-N}$. The water return 128 may be an outlet to a pump (not shown) and/or filter (not shown).

As shown in FIG. 1A, the plant growth apparatus 100 may include the vapor duct 110, the cascade points 112$_{A-N}$, the mounts 114$_{A-N}$, the spill throughs 118$_{A-N}$, the reservoir 202, the water return 128, and/or the vaporizer 210. The vapor duct 110 may be formed through the plant wall 108 to allow the passage of vapor into the plant enclosure 102. The vapor duct 110 may be situated at the top portion 126 of the plant wall 108. The cascade points 112$_{A-N}$ may be perforated into the plant wall 108 to allow passage of water from the trough 204 (not shown) located behind the cascade points 112$_{A-N}$ of the plant wall 108. The cascade points 112$_{A-N}$ may be positioned below the vapor duct 110.

The mounts 114$_{A-N}$ may be attached to the plant wall 108 and may include the plant receivers 116$_{A-N}$. The mounts 114$_{A-N}$ may be horizontally attached to the plant wall 108. Plants may be set into the plant receivers 116$_{A-N}$ of the mounts 114$_{A-N}$ and the bottom portion of the plants (not shown) may occupy a root space 402 (not shown) formed by the plant wall 108 and the mounts 114$_{A-N}$. The mounts 114$_{A-N}$ may be oriented against the plant wall 108 at an angle between 10 degrees and/or 70 degrees. The spill throughs 118$_{A-N}$ may be cut into the mounts 114$_{A-N}$. The spill throughs 118$_{A-N}$ may allow water to enter the root space 402 (not shown) after moving down the plant wall 108 from the cascade points 112$_{A-N}$. The spill throughs 118$_{A-N}$ may allow for a portion of the water to move to the pool 124 below the mounts 114$_{A-N}$. The spill throughs 118$_{A-N}$ are cut into the mounts 114$_{A-N}$. The spill throughs 118$_{A-N}$ are longer in width than its height. The reservoir 202 is formed from a reservoir wall 206, a rear wall 210, the left wall 104, and the right wall 106 of the plant enclosure 102.

The pool 124 may be formed from the base 122, the left wall 104, the right wall 106, the rear wall 208, and/or the front wall 120 of the plant enclosure 102. The plant enclosure 102 may be formed from the plant wall 108, the left wall 104, the right wall 106, the front wall 120, and/or the base 122 of the plant enclosure 102.

Figure 1B:
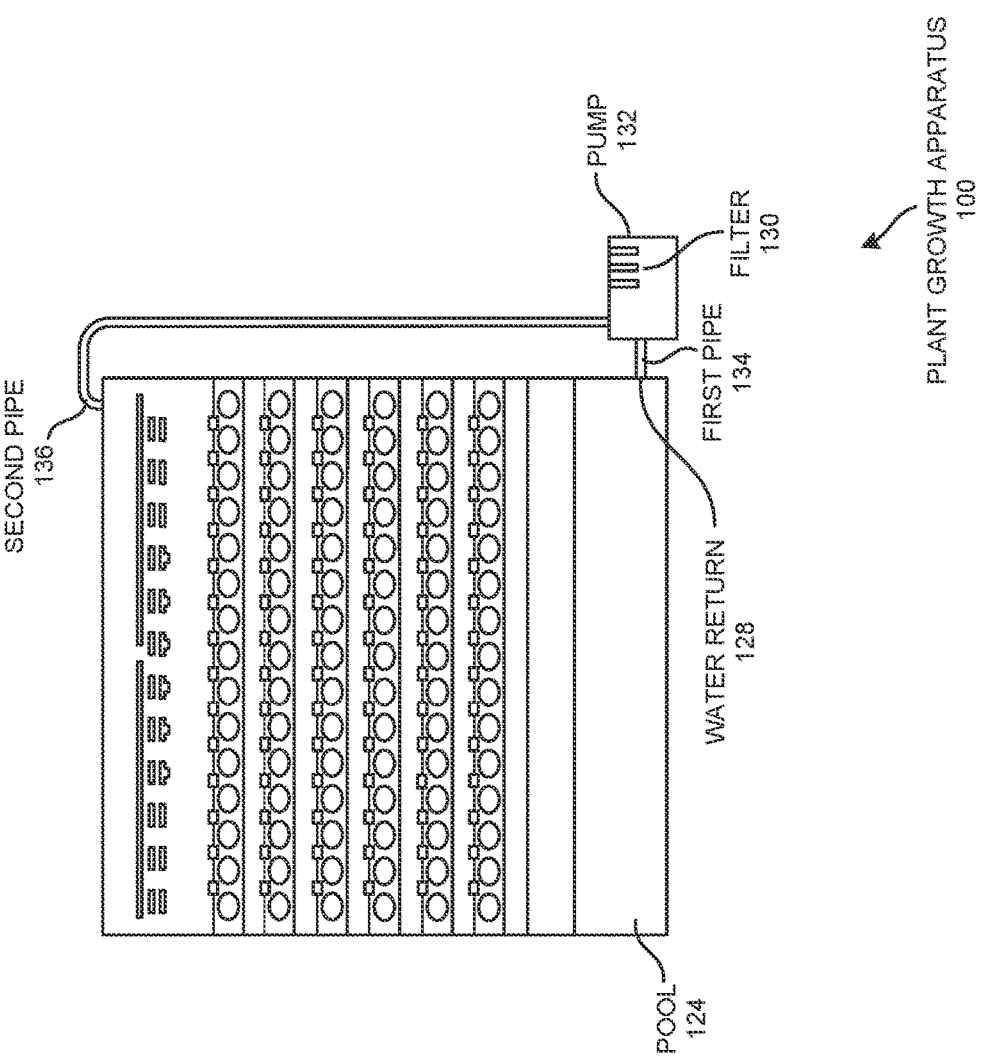
FIG. 1B is a front elevational view of the plant growth apparatus of FIG. 1A illustrating the additional components of the plant growth apparatus, according to one embodiment.

FIG. 1B is a front elevational view of the plant growth apparatus 100 of FIG. 1A illustrating the additional components of the plant growth apparatus 100, according to one embodiment. Particularly, FIG. 1B builds on FIG. 1A, and further adds, a filter 130, a pump 132, a first pipe 134, and a second pipe 136.

The filter 130 may be an external mechanical filter, a biological filter, a chemical filter, a canister filter, and/or undergravel filter. The pump 132 may be a centrifugal pump, an external return pump, a DC pump, a peristaltic pump, a dry pump, and/or a magnetic drive pump. The first pipe 134 may be PVC pipe, flexible tubing, vinyl tubing, hosing, and/or metal piping. The second pipe 136 may be PVC pipe, flexible tubing, vinyl tubing, hosing, and/or metal piping.

As shown in FIG. 1B the water return 128 may connect the pool 124 of the plant enclosure 102 and the reservoir 202 (not shown). The water return 128 may allow water to move from the pool 124 back into the reservoir 202 via the pump 132. The water return 128 of the pool 124 may be connected to the first pipe 134. The first pipe 134 may move water from the pool 124 to the filter 130 and the pump 132 wherein the water may be cleaned and returned to the reservoir 202 (not shown) via the second pipe 136.

Figure 2:
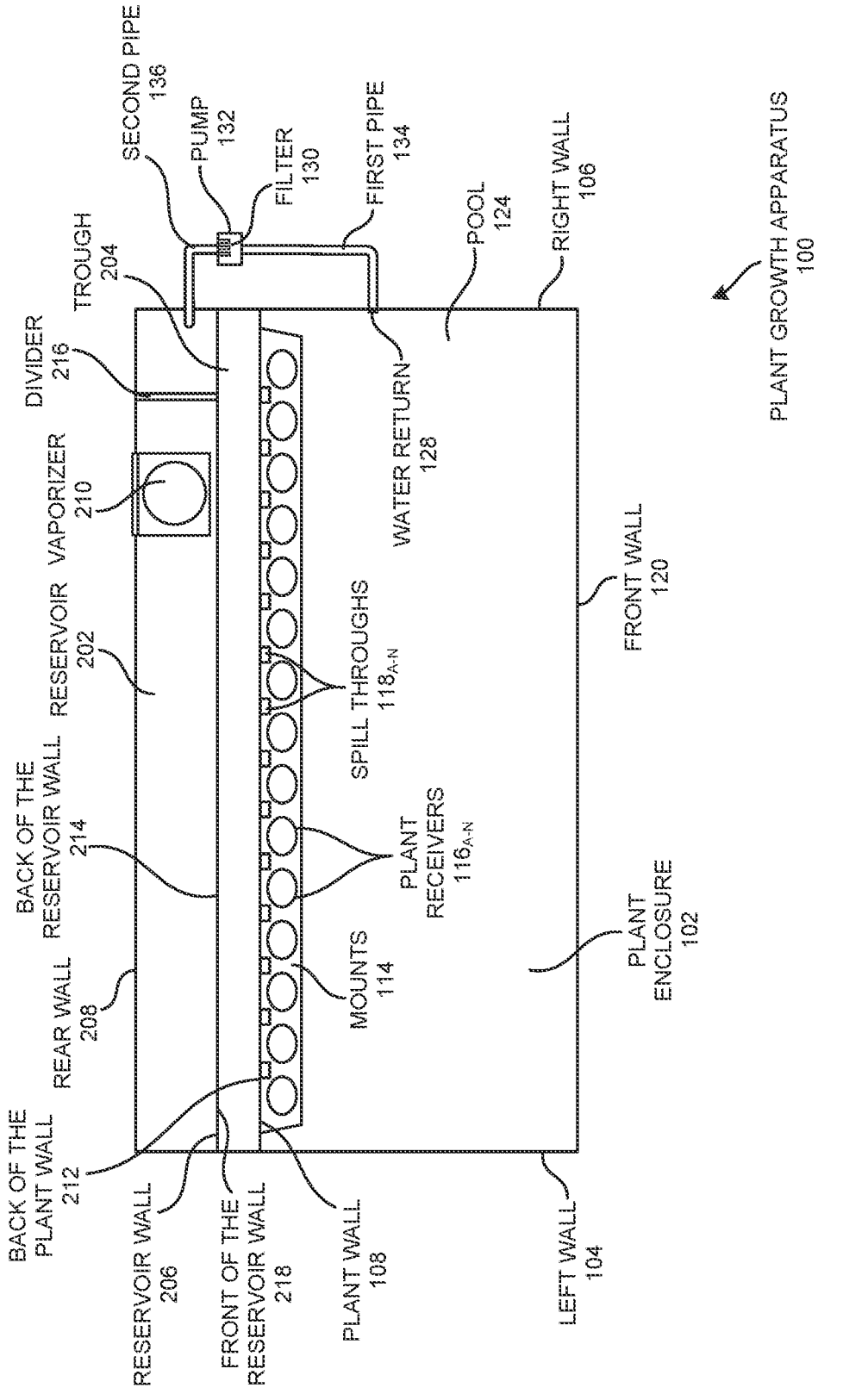
FIG. 2 illustrates a cross sectional view of the plant growth apparatus of FIGS. 1A & 1B, according to one embodiment.

FIG. 2 illustrates a cross sectional view of the plant growth apparatus 100 of FIGS. 1A & 1B, according to one embodiment.

FIG. 2 illustrates the plant enclosure 102, the left wall 104, the right wall 106, the plant wall 108, the mount 114, the plant receivers 116$_{A-N}$, the spill throughs 118$_{A-N}$, the front wall 120, the pool 124, the water return 128, the filter 130, the pump 132, the first pipe 134, the second 136, a reservoir 202, a trough 204, a reservoir wall 206, a rear wall 208, a vaporizer 210, a back of the plant wall 212, a back of the reservoir wall 214, a divider 216, and a front of the reservoir wall 218.

The reservoir 202 may be a water collection area formed from the left wall 104, the right wall 106, the reservoir wall 206, and the rear wall 208. The trough 204 may be in between the plant enclosure 102 and the reservoir 202 and may be attached to the reservoir wall 206 and/or the plant wall 108. The reservoir wall 206 may be situated between the plant wall 108 and the rear wall 208 and may partially form the reservoir 202. The reservoir wall 206 may extend downward to the base 122. The rear wall 208 may be at the rear most portion of the plant growth apparatus 100 and may possibly form the reservoir 202. The rear wall 208 may extend downward to the base 122. The vaporizer 210 may be a ultrasonic humidifier, an evaporative humidifier, a steam vaporizer, a nebulizer, a dry vaporizer, a laboratory vaporizer, and/or a fog machine. The back of the plant wall 212 may be the rear side of the plant wall 108 and may partially form the interchamber space 404 (not shown). The back of the reservoir wall 214 may be the rear portion of the reservoir wall 206 and may partially form the reservoir 202. The divider 216 may be a tab placed in the reservoir 202 to form a separately defined area within the reservoir 202 and the divider 216 may extend downward to the base 122 or extend downward only partially. The front of the reservoir wall 218 may be a connection point for the trough 204 and may partially form the interchamber space 404 (not shown).

As shown in FIG. 2, the reservoir 202 may be behind the plant wall 108 and may be formed from the reservoir wall 206, the rear wall 208, the left wall 104, and the right wall 106. The reservoir 202 may fill the trough 204 with water and may cause water to flow through the cascade points $112_{A-N}$, down the plant wall 108 and to the mounts $114_{A-N}$. Once the water reaches the mounts $114_{A-N}$, the water may crest over the mounts $114_{A-N}$, flow through the plant receivers $116_{A-N}$, and/or through the spill throughs $118_{A-N}$. The water may eventually reach the pool 124.

Once the water reaches the pool, the first pipe 134 may drain water from the pool 124 into the external filter 130 and/or the pump 132 may move the filtered water through the second pipe 136 into the reservoir 202. The external filter 130 may include the pump 132 of the plant growth apparatus 100. The second pipe 136 may drain filtered water into reservoir 202 at the top of the reservoir 408.

The vaporizer 210 may be located at least partially within the reservoir 202. The vaporizer 210 may create vapor from the water in the reservoir 202 and may move the vapor through the vapor duct 110 to the plant enclosure 102. The vaporizer 210 may be removable attached to the rear wall 208 and/or the reservoir wall 206. At least one divider 216 may be located in the reservoir 202. The divider 216 may create at least two chambers within the reservoir 202. The two chambers within the reservoir 202 may be implanted with a filtration media 904 (not shown).

The trough 204 may be situated between the plant wall 108 and the reservoir wall 206. The trough 204 may be attached to the front of the reservoir wall 218 and/or the back of the plant wall 212.

Figure 3:
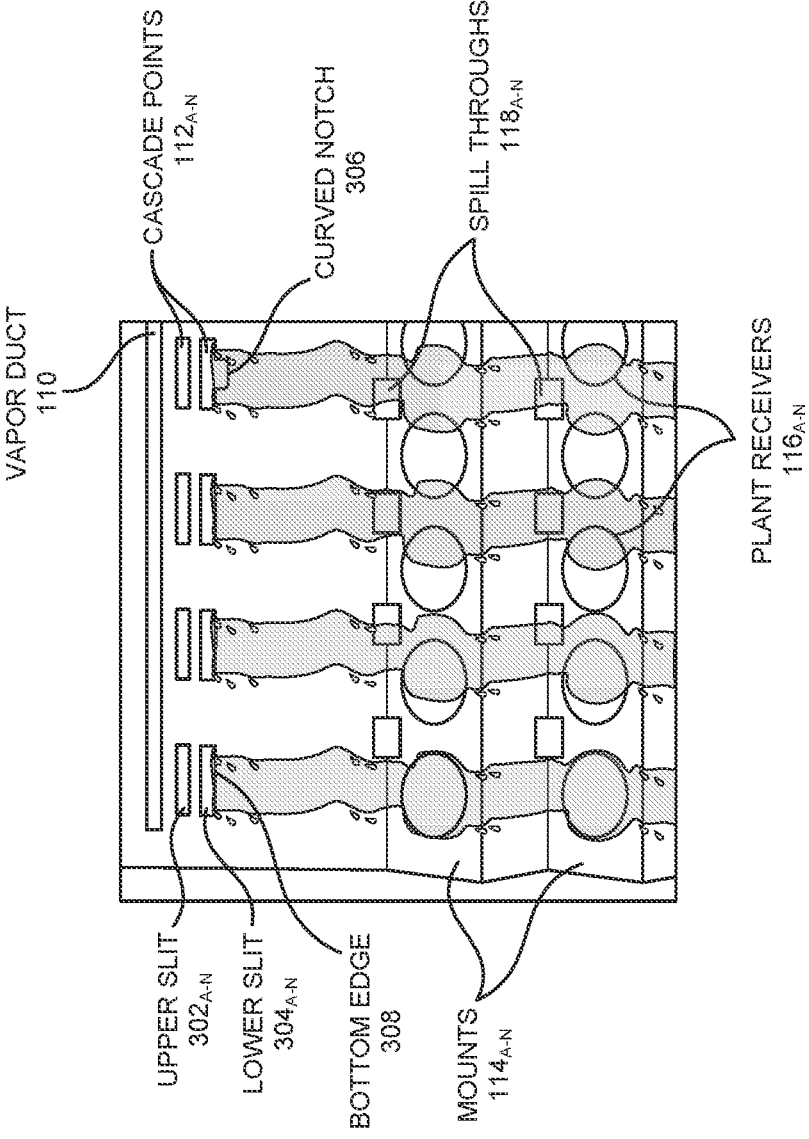
FIG. 3A illustrates a front view of a portion of the plant growth apparatus of FIGS. 1A & 1B wherein water is moving down the plant wall, through the spill throughs, and over the mounts, according to one embodiment.
FIG. 3B illustrates a side view of the plant growth apparatus of FIGS. 1A & 1B wherein the left wall is removed to show water moving through the root spaces into the pool, according to one embodiment.

FIG. 3 illustrates a front view of a portion of the plant growth apparatus 100 of FIGS. 1A & 1B wherein water is flowing through the cascade points $112_{A-N}$ and down the plant wall 108, through the spill throughs $118_{A-N}$, and over the mounts $114_{A-N}$, according to one embodiment.

FIG. 3 illustrates the vapor duct 110, the cascade points $112_{A-N}$, the mounts $114_{A-N}$, the plant receivers $116_{A-N}$, the spill throughs $118_{A-N}$, a plurality of upper slits $302_{A-N}$, a plurality of lower slits $304_{A-N}$, a curved notch 306, and a bottom edge 308.

The upper slits $302_{A-N}$ may be an opening in the plant wall 108 above the mounts $114_{A-N}$ that is longer in width than its height and may be located above the mounts $114_{A-N}$ and/or below the upper slits $302_{A-N}$. The upper slits $302_{A-N}$ may be an additional opening for water to move through and may prevent overfilling of the trough 204. The lower slits $304_{A-N}$ may include the curved notch 306 on the bottom edge 308 of the lower slit $304_{A-N}$. The curved notch 306 may be a cut-out on the bottom portion of the lower slit $304_{A-N}$. The curved notch 306 may help to direct water down the plant wall 108 in a manner that optimally provides the plants with water.

As shown in FIG. 3, the cascade points $112_{A-N}$ may be cut into the top portion 126 of the plant wall 108 at an area slightly above the trough 204. The cascade points $112_{A-N}$ may include the upper slits $302_{A-N}$ and the lower slits $304_{A-N}$. The lower slit $304_{A-N}$ may or may not comprise the curved notch 306. The curved notch 306 may aid in directionally orienting the flow of water as it moves through the lower slit $304_{A-N}$ and down the plant wall 108. The bottom edge 308 may be the lower border of the lower slit $304_{A-N}$ and may be where the optional curved notch 306 is attached to the lower slit $302_{A-N}$ of the plurality of cascade points $112_{A-N}$.

As shown in FIG. 3, the lower slits $302_{A-N}$ may comprise the curved notch 306 on the bottom edge 308 of the lower slit $304_{A-N}$. The outermost lower slits $304_{A-N}$ may not have the curved notch 306 in order to properly direct water through the trough 204 and down the plant wall 108.

As further shown in FIG. 3, as the trough 204 fills with water, the water enters the plant enclosure 102 through the cascade points $112_{A-N}$. As the water moves down the plant wall, the water may crest the mounts $114_{A-N}$, the water may flow through the plant receivers $116_{A-N}$, and/or the water may flow through the spill throughs $118_{A-N}$. The water may also spill over the mounts $114_{A-N}$ to water the plants leaves and stems. The water may eventually reach the pool 124 where it may then be pumped back to the reservoir 202.

Figure 4A:
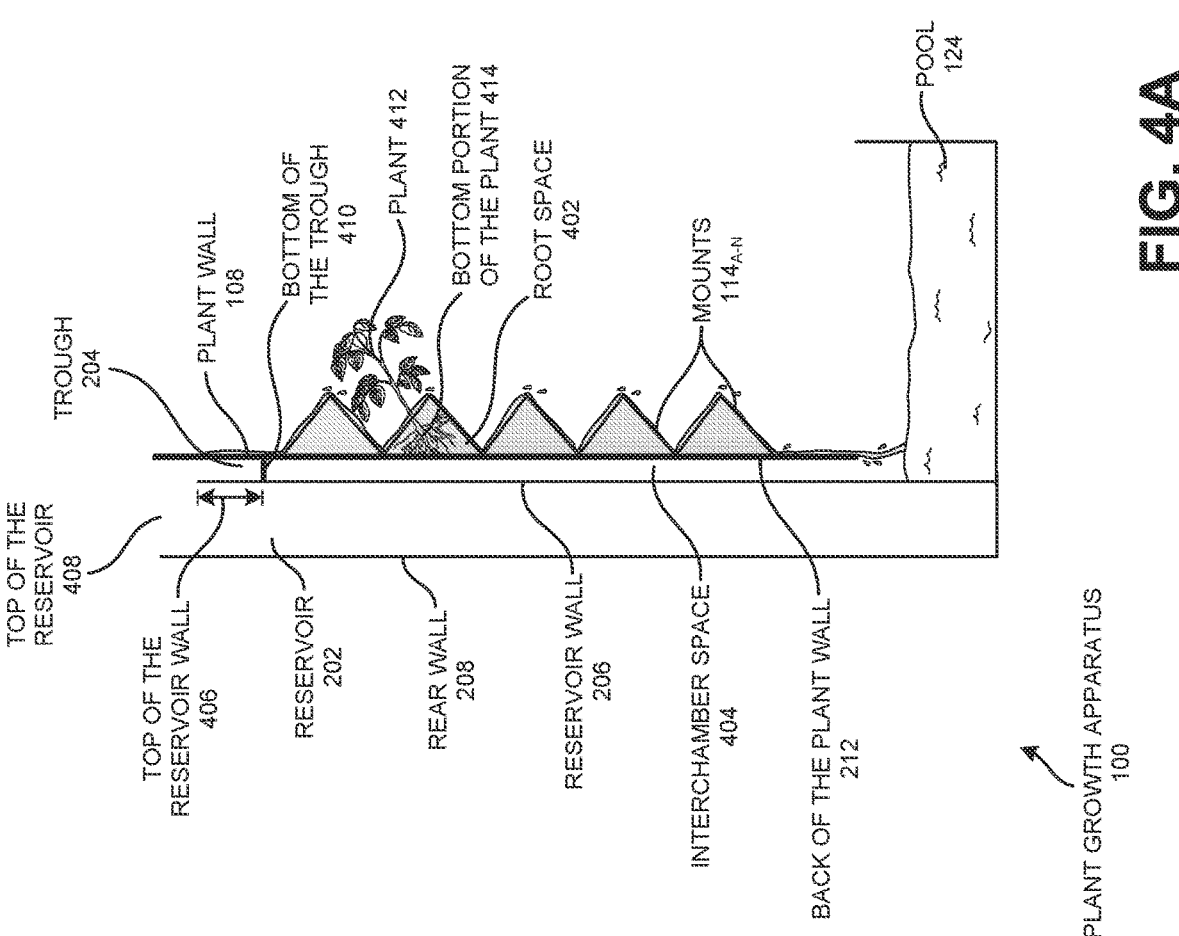
FIG. 4A is a side view of the plant growth apparatus of FIGS. 1A & 1B illustrating the flow of water from the cascade points to the pool, according to one embodiment.

FIG. 4A illustrates a side view of the plant growth apparatus 100 of FIGS. 1A & 1B wherein the left wall 104 is removed to show water moving through the root space 402 into the pool 124, according to one embodiment.

FIG. 4A illustrates the plant wall 108, the mounts $114_{A-N}$, the pool 124, the reservoir 202, the trough 204, the reservoir wall 206, the rear wall 208, a root space 402, an interchamber space 404, a top of the reservoir wall 406, a top of the reservoir 408, a bottom of the trough 410, a plant 412, and a bottom portion of the plant 414.

The root space 402 may be an area between the mounts $114_{A-N}$ and the plant wall 108 wherein when a plant is set in the plant receiver $116_{A-N}$, the roots of the plant occupy at least a portion of the root space 402. The interchamber space 404 may be an area formed by the left wall 104 (not shown), the right wall 106 (not shown), the reservoir wall 206, the plant wall 108, and the trough 204. The top of the reservoir wall 406 may be a section of the reservoir wall above the trough 204. The top of the reservoir 408 may be an upper portion of the reservoir 202 at or above the trough 204. The bottom of the trough 410 may be the underside of the trough 204 and may be a perimeter component of the interchamber space 404. The plant 412 may be any plant that may be grown within an aquarium, terrarium, paludarium, and/or any other plant growth apparatus. The bottom portion of the plant 414 may be the plant's 412 roots, basal leaves or rosettes, lower stems, back side of the leaves, tubers, rhizomes, bulbs, and/or older growth.

As shown in FIG. 4A, the reservoir 202 may be located behind the trough 204 and the interchamber space 404. The reservoir 202 may fill the trough 204 with water and cause the water to flow through the cascade points $112_{A-N}$ onto the plant wall 108. The reservoir 202 may fill the trough 204 by filling the trough 204 to a point where water spills through the cascade points $112_{A-N}$. The trough 204 may be attached to the back of the plant wall 212 below the top of the reservoir wall 406 and/or at the top of the reservoir wall 406. The trough 204 may be flat or curved.

As further shown in FIG. 4A, as water moves down the plant wall 108, the water may spill over the mounts $114_{A-N}$ or it may enter the root space 402 by moving through the spill throughs $118_{A-N}$ or by entering the plant receivers $116_{A-N}$. The water may eventually move from the cascade points $112_{A-N}$ to the pool 124. After reaching the pool 124, the water may be pumped back to the reservoir 202. The bottom portion of the plant 414 may occupy the root space 402.

The interchamber space 404 may be situated between the plant enclosure 102 and the reservoir 202. The interchamber space 404 may be formed from the left wall 104, the right wall 106, the back of the plant wall 212, the front of the reservoir wall 218, and/or the bottom of the trough 410. The interchamber space 404 may house an internal filter (not shown) and/or piping.

Figure 4B:
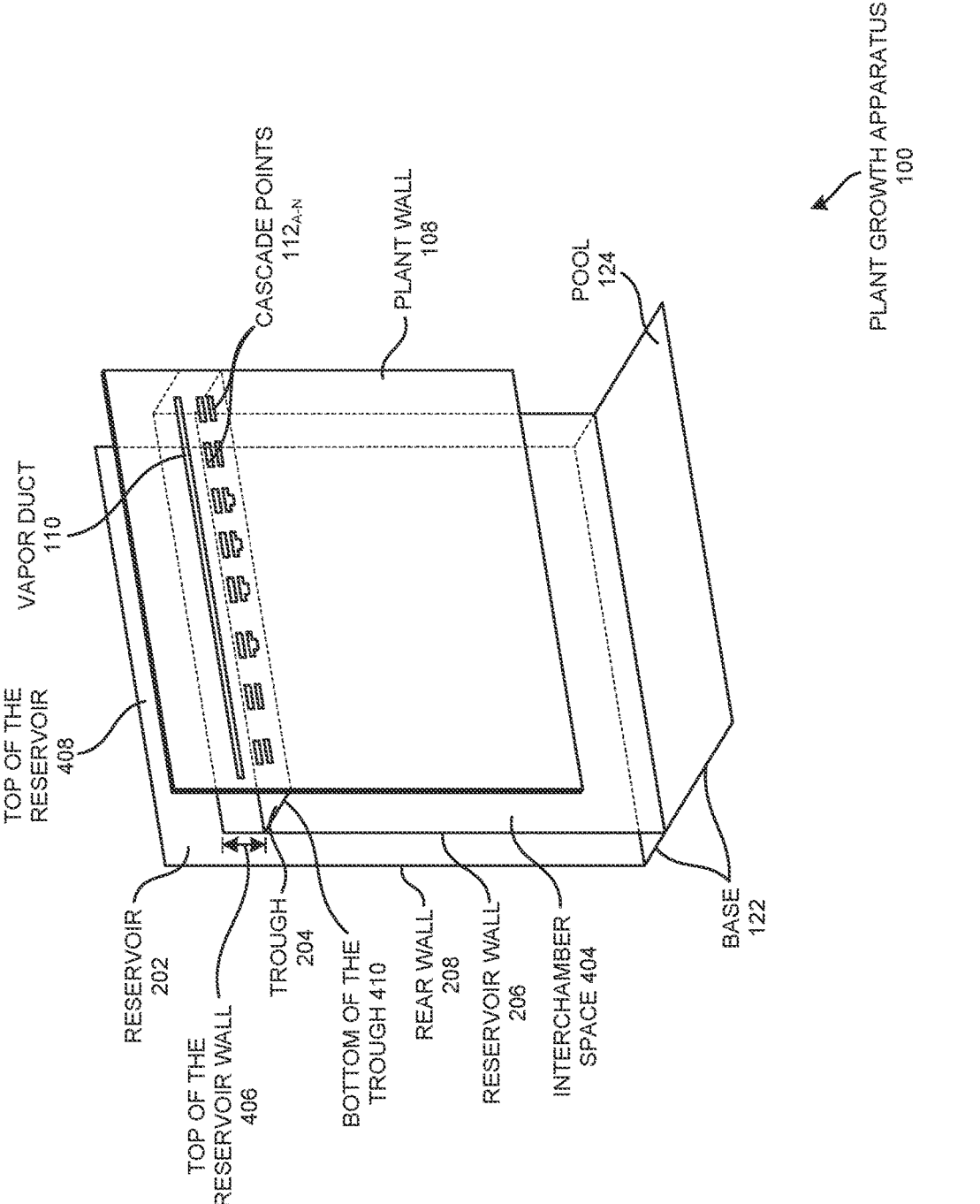
FIG. 4B is a side view of the plant growth apparatus of FIGS. 1A & 1B illustrating optional apertures on the plant wall, according to one embodiment.

FIG. 4B is an exploded view of the plant growth apparatus 100 of FIGS. 1A & 1B illustrating the internal components of the plant growth apparatus 100, according to one embodiment. Furthermore, FIG. 4B illustrates the plant growth apparatus 100 of FIGS. 1A & 1B without apertures $502_{A-N}$, according to one embodiment.

FIG. 4B illustrates the plant wall 108, the vapor duct 110, the cascade points $112_{A-N}$, the base 122, the pool 124, the reservoir 202, the trough 204, the reservoir wall 206, the rear wall 208, the interchamber space 404, the top of the reservoir wall 406, the top of the reservoir 408, and the bottom of.

As shown in FIG. 4B, the plant wall 108 may extend downward, but may not reach the base 122 thus connecting the interchamber space 404 to the pool 124. The interchamber space 404 may be situated between the plant enclosure 102 and the reservoir 202. The interchamber space 404 may be formed from the left wall 104, the right wall 106, the back of the plant wall 212, the front of the reservoir wall 218, and/or a bottom of the trough 410. The cascade points $112_{A-N}$ may be cut into the plant wall 108 and may be above the trough 204. The reservoir wall 206 may be shorter than the plant wall 108. As the reservoir 202 fills with water, the water may reach a level where it spills over the reservoir wall 206 and spills into the trough 204. As the trough 204 fills with water, the water may begin to move through the cascade points $112_{A-N}$ and down the plant wall 108. The rear wall 208 may be taller than the reservoir wall 206. The rear wall 208 may extend down to the base 122.

Figure 5A:
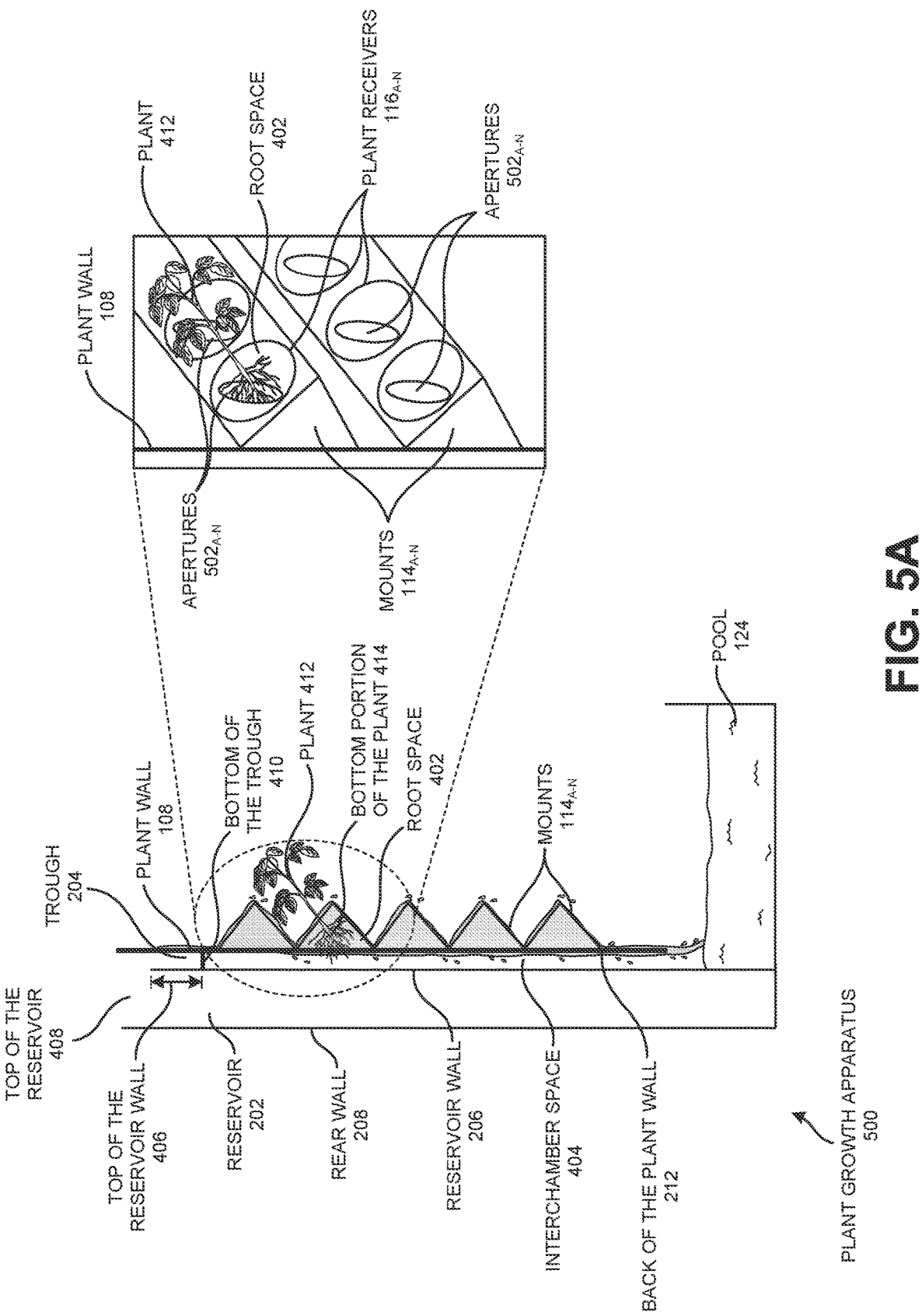
FIG. 5A is an oblique view of the plant growth apparatus of FIGS. 1A & 1B illustrating the plant wall without apertures, according to one embodiment.

FIG. 5A is a side view of an alternative embodiment of the plant growth apparatus 100 of FIGS. 1A & 1B illustrating optional apertures $502_{A-N}$ cut into the plant wall 108, according to one embodiment.

FIG. 5A illustrates a plant growth apparatus 500 comprising the plant wall 108, the mounts $114_{A-N}$, the plant receivers $116_{A-N}$, the pool 124, the reservoir 202, the trough 204, the reservoir wall 206, the rear wall 208, the root space 402, the interchamber space 404, the top of the reservoir wall 406, the top of the reservoir 408, the bottom of the trough 410, the plant 412, the bottom portion of the plant 414, and a plurality of apertures $502_{A-N}$. The apertures $502_{A-N}$ may be openings in the plant wall 108 that may allow the roots to enter the interchamber space 404. The apertures $502_{A-N}$ may provide stability to the plant and may assist in root growth by providing additional space for the roots to grow.

As shown in FIG. 5A, the interchamber space 404 may be situated between the plant enclosure 102 and the reservoir 202. The interchamber space 404 may be formed from the left wall 104, the right wall 106, the back of the plant wall 212, a front of the reservoir wall 218, and/or the bottom of the trough 410. The apertures $502_{A-N}$ may be cut into the plant wall 108 adjacent to the root space 402 of the mounts $114_{A-N}$ and/or the plant receivers $116_{A-N}$. The apertures $502_{A-N}$ may receive a bottom portion of the plant 414. The apertures $502_{A-N}$ may be formed in an oval, circular, square, triangular, and/or polygon shape. The apertures $502_{A-N}$ may allow roots of a plant to extend into the interchamber space 404. The apertures $502_{A-N}$ may also allow water to enter the interchamber space 404 as the water moves from the cascade points $112_{A-N}$ and into the root space 402. The interchamber space 404 may open to the pool 124 and may allow water to drain into the pool 124.

Figure 5B:
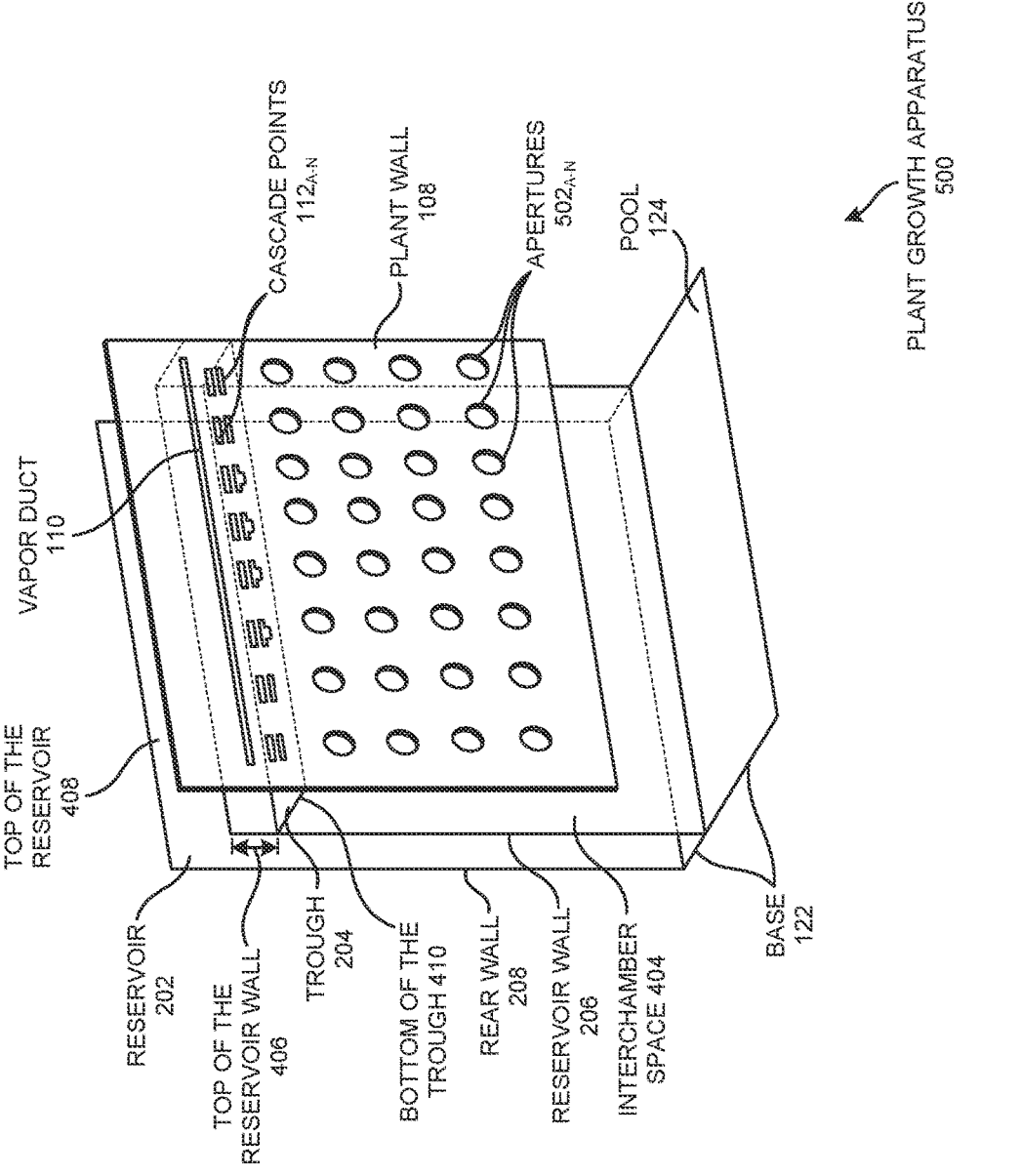
FIG. 5B is an oblique view of the plant growth apparatus of FIGS. 1A & 1B illustrating the plant wall with apertures, according to one embodiment.

FIG. 5B is an oblique view of the plant growth apparatus 500 of FIG. 5A illustrating the plant wall 108 with the apertures $502_{A-N}$, according to one embodiment.

FIG. 5B illustrates the plant wall 108, the vapor duct 110, the cascade points $112_{A-N}$, the base 122, the pool 124, the reservoir 202, the trough 204, the reservoir wall 206, the rear wall 208, the interchamber space 404, the top of the reservoir wall 406, and the top of the reservoir 408, the bottom of the trough 410, and the apertures $502_{A-N}$.

The apertures $502_{A-N}$ may be cut into the plant wall 108 adjacent to the root space 402 of the mounts $114_{A-N}$ and/or the plant receivers $116_{A-N}$. The apertures $502_{A-N}$ may receive a bottom portion of the plant 414 and may allow the roots and/or other portions of the plant 412 to enter the interchamber space 404. The apertures $502_{A-N}$ may support a plant and/or plant pot, plant bag, and/or other plant container. The apertures $502_{A-N}$ may be cut into the plant wall 108 in a manner to correspond to one or more of the plant receivers $116_{A-N}$. The apertures $502_{A-N}$ may open to the interchamber space 404 and the interchamber space 404 may open to the pool 124 so that when water moves down the plant wall 108, if water reaches the interchamber space 404, the water may be returned to the reservoir 202.

Figure 6:
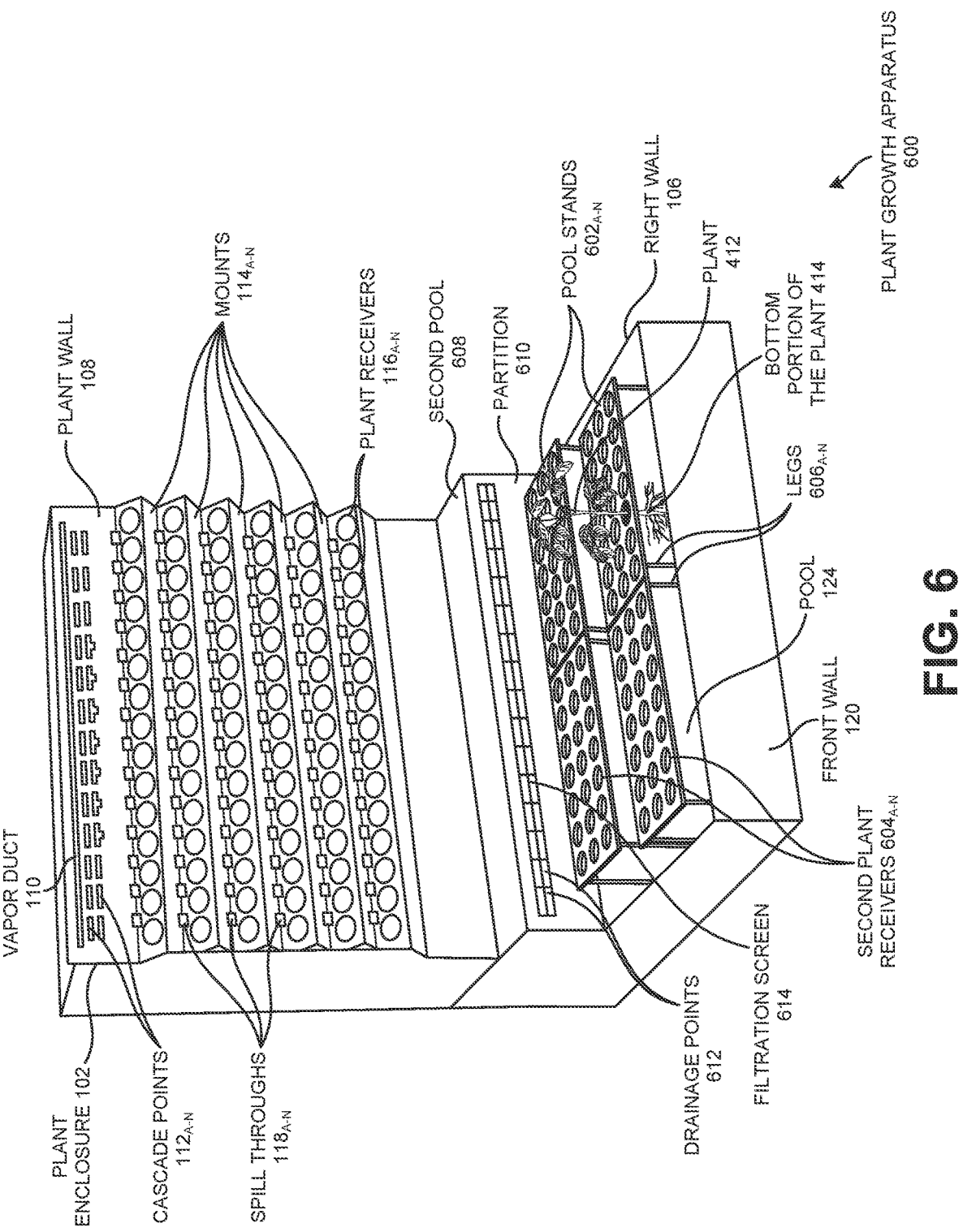
FIG. 6 illustrates an alternative embodiment of the plant growth apparatus depicted in FIGS. 1A & 1B wherein a second pool drains into the pool and the pool contains second plant receivers, according to one embodiment.

FIG. 6 illustrates an alternative embodiment of the plant growth apparatus 100 depicted in FIGS. 1A & 1B wherein the pool 124 contains a plurality of second plant receivers $604_{A-N}$ that are cut into at least one pool stand 602.

FIG. 6 illustrates a plant growth apparatus 600 comprising the plant enclosure 102, the right wall 106, the plant wall 108, the vapor duct 110, the cascade points $112_{A-N}$, the mounts $114_{A-N}$, the plant receivers $116_{A-N}$, the spill throughs $118_{A-N}$, the base 122, the pool 124, the top portion 126 of the plant wall 108, the water return 128, a pool stands $602_{A-N}$, the second plant receivers $604_{A-N}$, a legs $606_{A-N}$, a second pool 608, a partition 610, a drainage point 612, and a filtration screen 614.

The pool stands $602_{A-N}$ may be devices that allow a plant to be either partially or fully submerged in the pool 124. The second plant receivers $604_{A-N}$ may be openings in the pool stands $602_{A-N}$ that support and secure a plant as it sits in the pool 124. The legs $606_{A-N}$ may be structures that support the pool stands $602_{A-N}$ as it sits in the pool 124 and may be adjustable. The second pool 608 may be higher than the pool 124 and may be the collection point for water as it comes off of the plant wall 108, the spill throughs $118_{A-N}$, and/or the mounts $114_{A-N}$. The pool 124 may be formed from the left wall 104, the right wall 106, the partition 610, and the reservoir wall (not shown). The partition 610 may be a wall that separates the second pool 608 from the pool 124 and may partially form the second pool 608. The drainage point 612 may be an opening in the partition 610 to allow water to flow from the second pool 608 to the pool 124. The filtration screen 614 may be a sediment filter, a screen filter, a strainer, a basket filter, a cartridge filter, a sand filter, irrigation filter, a microscreen filter, a drum filter, a screen channel filter, and/or a screen tube filter. The filtration screen 614 may be implanted within the drainage point 612.

As shown in FIG. 6, the plant growth apparatus 600 may include the second pool 608 formed from the left wall 104, the right wall 106, the reservoir wall 206, and the partition 610. The second pool 608 may be elevated above the pool 124. The partition 610 may separate the second pool 608 from the pool 124. The partition 610 may comprise at least one drainage point 612. The drainage point 612 may comprise the filtration screen 614 to filter the water draining from the second pool 608 into the pool 124. The filtration screen 614 may be configured to collect different sized particles as water moves from the second pool 608 to the pool 124.

The plant growth apparatus 600 may include at least one pool stand 602. The pool stands 602$_{A-N}$ may include the legs 606$_{A-N}$ and the second plant receivers 604$_{A-N}$. The pool stand 602$_{A-N}$ may allow a plant to be at least partially submerged within the pool 124 when the plant is placed in the second plant receiver 604. The pool stand 602$_{A-N}$ and/or the legs 606$_{A-N}$ may be adjustable and may raise or lower. The pool stand 602 may be modular and may be removed from the pool 124 of the plant enclosure 102.

The second pool 608 may be above the pool 124 and may be below the plant wall 108 and the mounts 114$_{A-N}$. As water moves down the plant wall 108, the mounts 114$_{A-N}$, the apertures 502$_{A-N}$ (not shown), the interchamber space 404 (not shown), and/or the spill throughs 118$_{A-N}$, the water may move into and collect in the second pool 608. The water in the second pool 608 may drain through the drainage points 612 into the pool 124. The drainage point 612 may contain the filtration screen 614 which may filter water as it moves from the second pool 608 into the pool 124. The filtration screen 614 may assist in isolating unwanted particles within the second pool 608. The apparatus 600 may include a vapor duct 110. The vapor duct 110 may be cut into the plant wall 108 and may be oriented to direct vapor in a certain direction and/or area of the plant enclosure 102.

Figure 7:
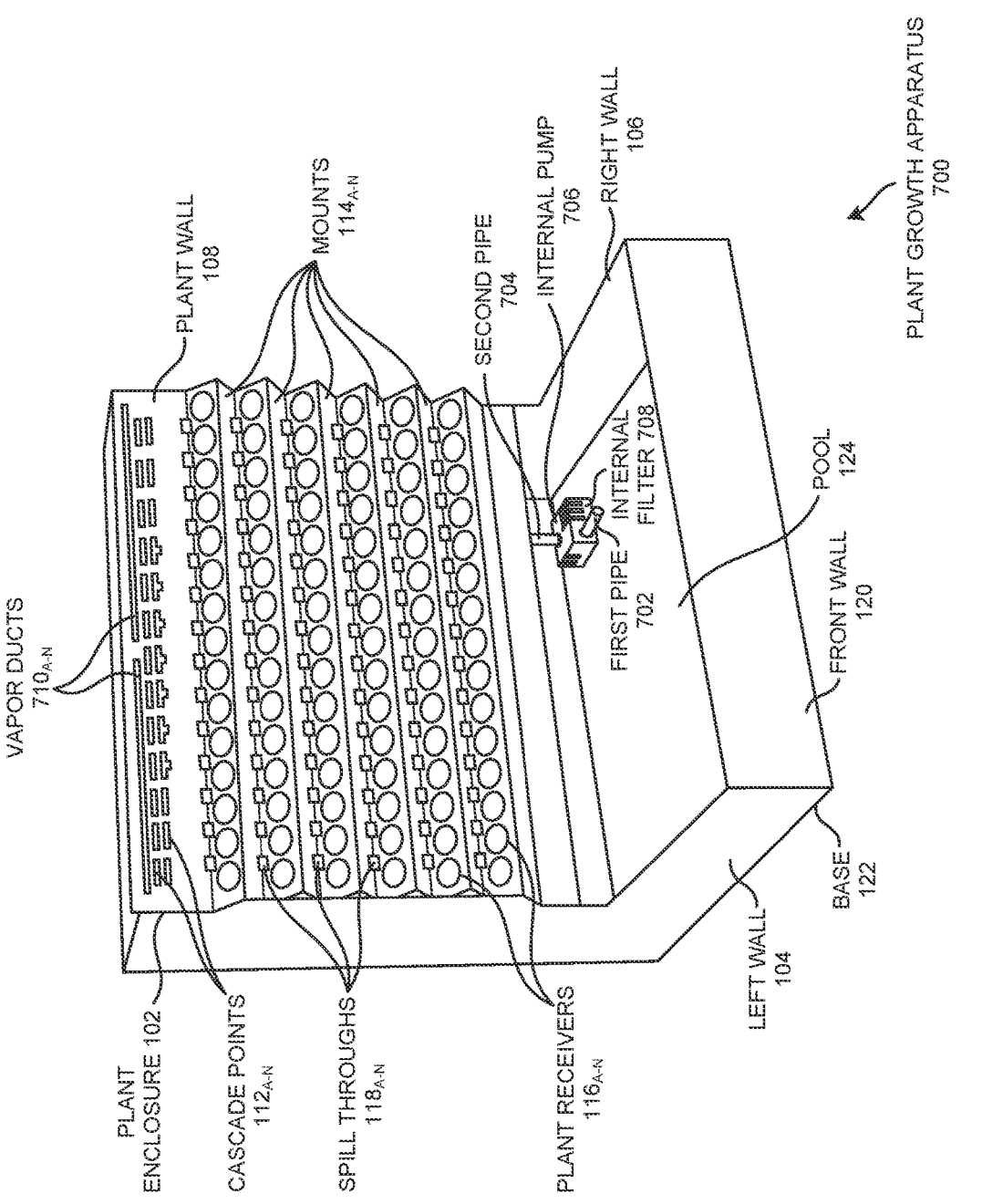
FIG. 7 illustrates an alternative embodiment of the plant growth apparatus depicted in FIGS. 1A & 1B wherein the filter and the pump are within the pool and send water to the reservoir via a second pipe located within the interchamber space, according to one embodiment.

FIG. 7 illustrates an alternative embodiment of the plant growth apparatus 100 depicted in FIGS. 1A & 1B wherein an internal filter 708 and an internal pump 706 are within the pool 124 and may move water to the reservoir 202 via a second pipe 704 located within the interchamber space 404, according to one embodiment.

FIG. 7 illustrates a plant growth apparatus 700 comprising the plant enclosure 102, the right wall 106, the plant wall 108, the vapor duct 110, the cascade points 112$_{A-N}$, the mounts 114$_{A-N}$, the plant receivers 116$_{A-N}$, the spill throughs 118$_{A-N}$, the base 122, the pool 124, the top portion 126 of the plant wall 108, the water return 128, a first pipe 702, the second pipe 704, the internal pump 706, the internal filter 708, and a vapor ducts 710$_{A-N}$.

The first pipe 702 may be PVC pipe, flexible tubing, vinyl tubing, hosing, and/or metal piping. The second pipe 704 may be PVC pipe, flexible tubing, vinyl tubing, hosing, and/or metal piping. The internal pump 706 may be a centrifugal pump, an external return pump, a DC pump, a peristaltic pump, a dry pump, and/or a magnetic drive pump. The internal filter 708 may be an internal mechanical filter, a biological filter, a chemical filter, a canister filter, and/or undergravel filter. The vapor ducts 710$_{A-N}$ may be formed through the plant wall 108 to allow the passage of vapor into the plant enclosure 102

As shown in FIG. 7, the internal filter 708 within interchamber space 404 may include the internal pump 706.

The internal pump 706 may move water from the pool 124 to the internal filter 708 via the first pipe 702 and further may move the filtered water through the second pipe 704 into the top of the reservoir 408.

Figure 8:
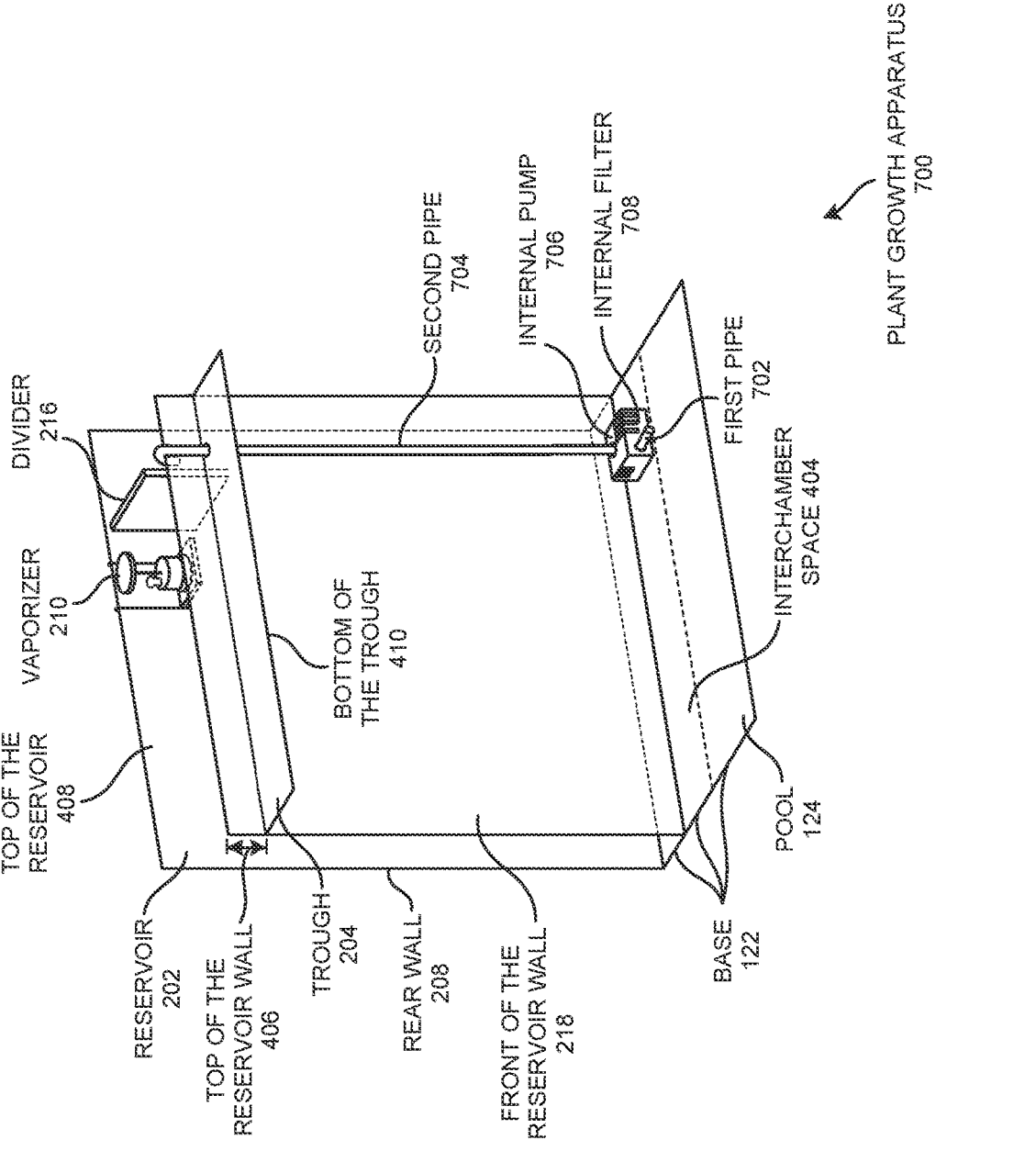
FIG. 8 is an oblique view of the plant growth apparatus of FIG. 7 wherein the filter and the pump are within the pool and send water to the reservoir via a second pipe located within the interchamber space, according to one embodiment.

FIG. 8 is an oblique view of the plant growth apparatus 700 of FIG. 7 wherein the internal filter 708 and the internal pump 706 are within the pool 124 and send water to the reservoir 202 via the second pipe 704 located within the interchamber space 404, according to one embodiment.

FIG. 8 illustrates the base 122, the pool 124, the reservoir 202, the trough 204, the reservoir wall 206, the rear wall 208, the vaporizer 210, the divider 216, the front of the reservoir wall 218, the interchamber space 404, the top of the reservoir wall 406, the top of the reservoir 408, the bottom of the trough 410, the first pipe 702, the second pipe 704, the internal pump 706, and the internal filter 708.

As shown in FIG. 8, the vaporizer 210 may be located at least partially within the reservoir 202. The vaporizer 210 may create vapor from the water in the reservoir 202 and the vapor moves through the vapor duct 110 to the plant enclosure 102. The interchamber space 404 may be situated between the plant enclosure 102 and the reservoir 202. The interchamber space 404 may be formed from the left wall 104, the right wall 106, the back of the plant wall 212, a front of the reservoir wall 218, and/or the bottom of the trough 410.

The trough 204 may be attached to the back of the plant wall 212 below the top of the reservoir wall 406 and/or at the top of the reservoir wall 406. As water fills the reservoir 202, water may spill over the top of the reservoir wall 406 into the trough 204. At least one divider 216 may be located in the reservoir 202. The divider 216 may create at least two chambers within the reservoir 202. The two chambers within the reservoir 202 may be implanted with a filtration media 904 (not shown).

Figure 9:
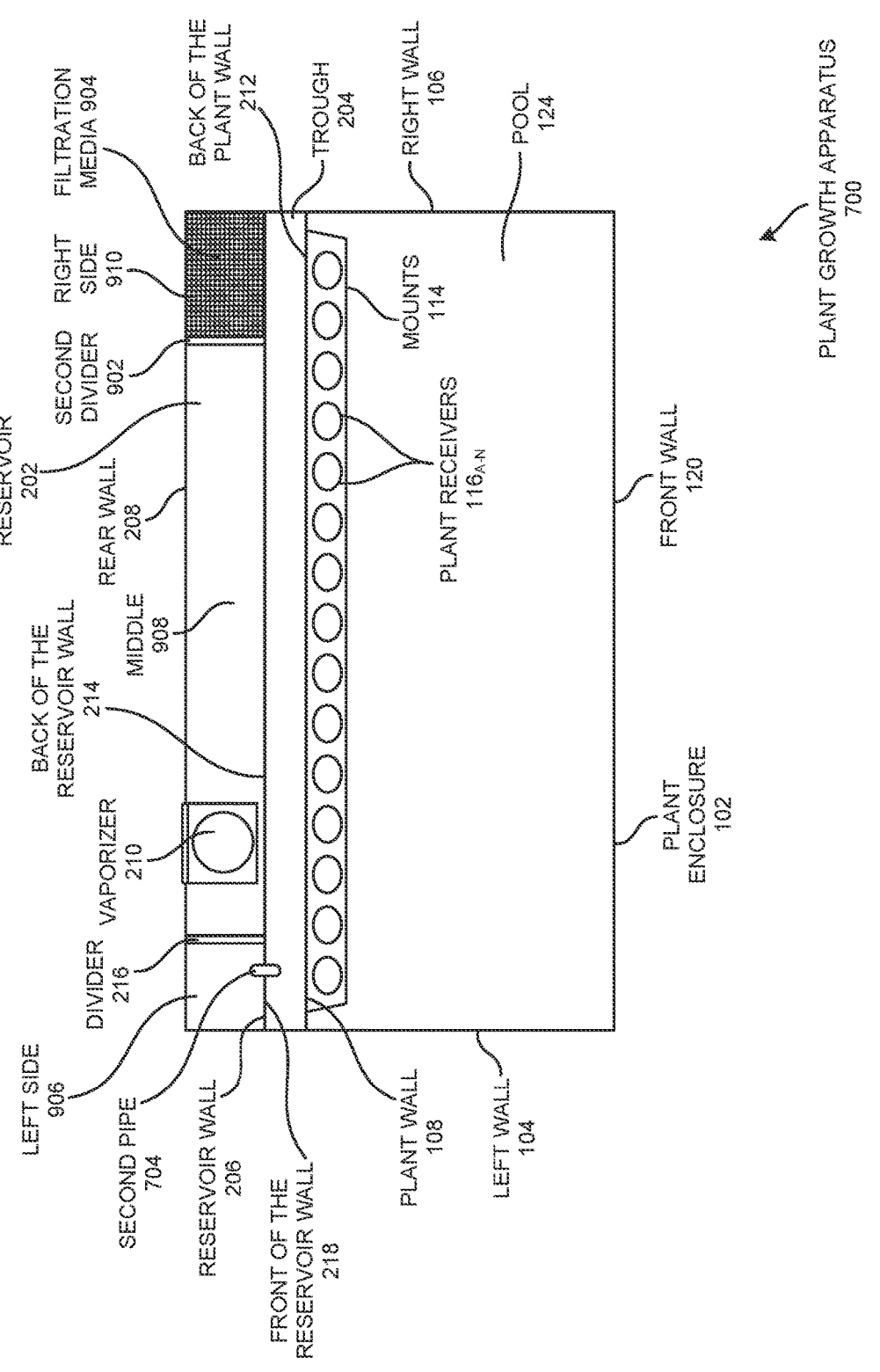
FIG. 9 illustrates a top view of the plant growth apparatus of FIG. 7, according to one embodiment.

FIG. 9 illustrates a top view of the plant growth apparatus 700 of FIG. 7, according to one embodiment. FIG. 9 illustrates the plant enclosure 102, the left wall 104, the right wall 106, the plant wall 108, the mount 114, the plant receivers 116$_{A-N}$, the spill throughs 118$_{A-N}$, the front wall 120, the pool 124, the reservoir 202, the trough 204, the reservoir wall 206, the rear wall 208, the vaporizer 210, the back of the plant wall 212, the back of the reservoir wall 214, the divider 216, the front of the reservoir wall 218, the second pipe 704, a second divider 902, a filtration media 904, a left side 906, a middle 908, and a right side 910. The second divider 902 may be a tab placed in the reservoir 202 to form a separately defined area within the reservoir 202 and the second divider 902 may extend downward to the base 122 or extend downward only partially. The filtration media 904 may be mechanical filtration media, biological filtration media, chemical filtration media, phosphate removal media, ammonia remover, activated carbon, and/or plants. The left side 906 may be a fully or partially enclosed portion of the reservoir 202 that may be created by inserting the divider 216 and/or the second divider 902 into the reservoir. The middle 908 may be a fully or partially enclosed portion of the reservoir 202 that may be created by inserting the divider 216 and/or the second divider 902 into the reservoir. The right side may be a fully or partially enclosed portion of the reservoir 202 that may be created by inserting the divider 216 and/or the second divider 902 into the reservoir.

As shown in FIG. 9, the vaporizer 210 is located at least partially within the reservoir 202. The vaporizer 210 creates vapor from the water in the reservoir 202 and the vapor moves through the vapor duct 110 to the plant enclosure 102.

The divider 216 may be located in the reservoir 202. The divider 216 may create at least two chambers within the reservoir 202. The chambers within the reservoir 202 may be implanted with a filtration media 904. The reservoir 202 of the apparatus 100 may be divided into the left side 906, the middle 908, and the right side 910 by a divider 216 and/or a second divider 902.

The filtration media 904 may be implanted in the left side 906 of the reservoir 202, the right side 910 of the reservoir 202, and/or the middle 908 of the reservoir 202. The filtration media 904 may assist the internal filter (not shown) in cleaning the water. The second pipe 704 may drain into the reservoir 202 at either the left side 906, the middle 908, and/or the right side 910. The second pipe 704 may drain directly into the filtration media 904. The vaporizer 210 may be partially in the left side of the reservoir 202, the right side of the reservoir 202, and/or the middle of the reservoir 202. The reservoir 202 may fill the trough 204 with water and may cause the water to flow through the cascade points 112$_{A-N}$. The water may flow from the cascade points 112$_{A-N}$ down the plant wall 108 and through the spill throughs 118$_{A-N}$ into the pool 124. The pool 124 may be formed from the left wall 104, the right wall 106, the plant wall 108, and/or the front wall 120, according to one embodiment.

Figure 10:
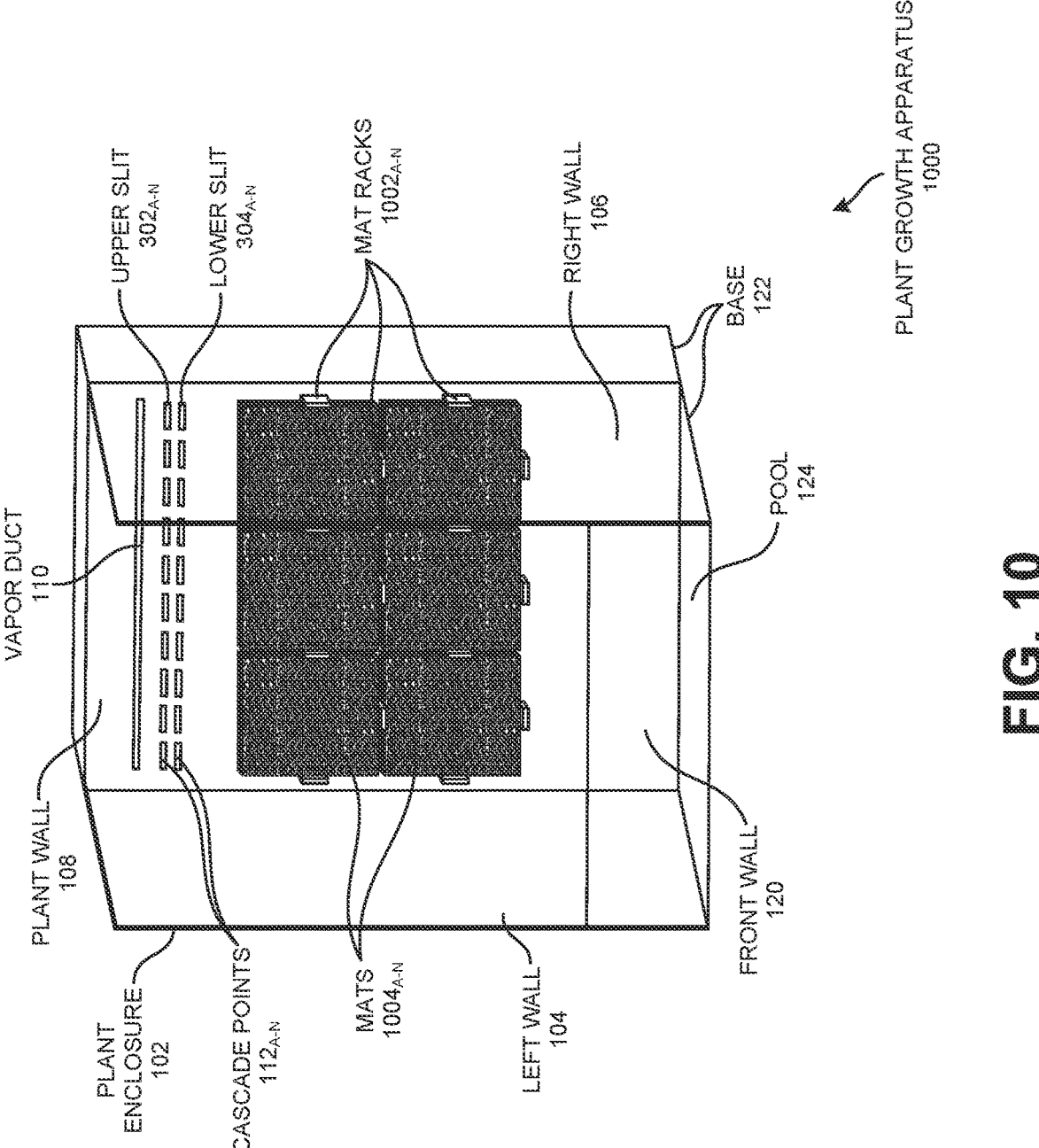
FIG. 10 illustrates an alternative embodiment of the plant growth apparatus of FIGS. 1A & 1B wherein mat racks and mats are attached to the plant wall.

FIG. 10 illustrates an alternative embodiment of the plant growth apparatus 100 of FIGS. 1A & 1B wherein a plurality of mat racks 1002$_{A-N}$ and a plurality of mats 1004$_{A-N}$ are attached to the plant wall 108.

FIG. 10 illustrates the plant enclosure 102, the left wall 104, the right wall 106, the plant wall 108, the vapor duct 110, the cascade points 112$_{A-N}$, the front wall 120, the base 122, the pool 124, the mat racks 1002$_{A-N}$, and the mats 1004$_{A-N}$.

The mat racks 1002$_{A-N}$ may be a framework comprising a number of support structures built on the plant wall 108 of the plant growth apparatus 1000. The mat racks 1002$_{A-N}$ may form a support to hold the mats 1004$_{A-N}$ in place inside the plant growth apparatus 1000. The mats 1004$_{A-N}$ may be made of a sturdy foam material to help water retention and accelerate plant growth. The mats 1004$_{A-N}$ may form a foundation for attaching aquatic and/or terrestrial plants. The texture of the mats 1004$_{A-N}$ may retain the ideal amount of water to support plants while remaining permeable for essential air flow and healthy root growth. The mats 1004$_{A-N}$ may be a Spunbond Polypropylene, a Needle-punched Polyester, a felt, a jute, a Hessian Cloth, a polyethylene mesh, a nylon netting, a polyester netting, a geotextile, and/or a smart textile according to one embodiment.

As shown in FIG. 10 the plant growth apparatus 1000 may comprise the plant enclosure 102. The plant enclosure 102 may be formed from the plant wall 108, the left wall 104, the right wall 106, and the front wall 120. The vapor duct 110 may be formed through the plant wall 108. The vapor duct 110 may allow the passage of vapor into the plant enclosure 102 via a vaporizer 210 (not shown). The vapor duct 110 may longer in width than its height.

The cascade points 112$_{A-N}$ may be perforated into the plant wall 108. The cascade points 112$_{A-N}$ may allow passage of water from the trough 204 (not shown). The trough 204 may be located behind the cascade points 112$_{A-N}$ of the plant wall 108. The cascade points 112$_{A-N}$ may comprise the upper slits 302$_{A-N}$ and the lower slits 304$_{A-N}$. The upper slits 302$_{A-N}$ may be longer in width than its height and the lower slits 304$_{A-N}$ may be longer in width than its height.

The cascade points 112$_{A-N}$ may allow water to move down the plant wall 108 to the mats 1004$_{A-N}$. Plants and/or plant roots may be embedded within the mats 1004$_{A-N}$. As the water moves through the mats 1004, the water may contact the plants and/or plant roots, which may promote plant growth and health. After moving through the mats 1004$_{A-N}$, the water may collect in the pool 124. The mat racks 1002$_{A-N}$ may be attached to the plant wall 108. Each mat rack 1002 of the mat racks 1002$_{A-N}$ may support at least one mat 1004 against the plant wall 108.

Figure 11:
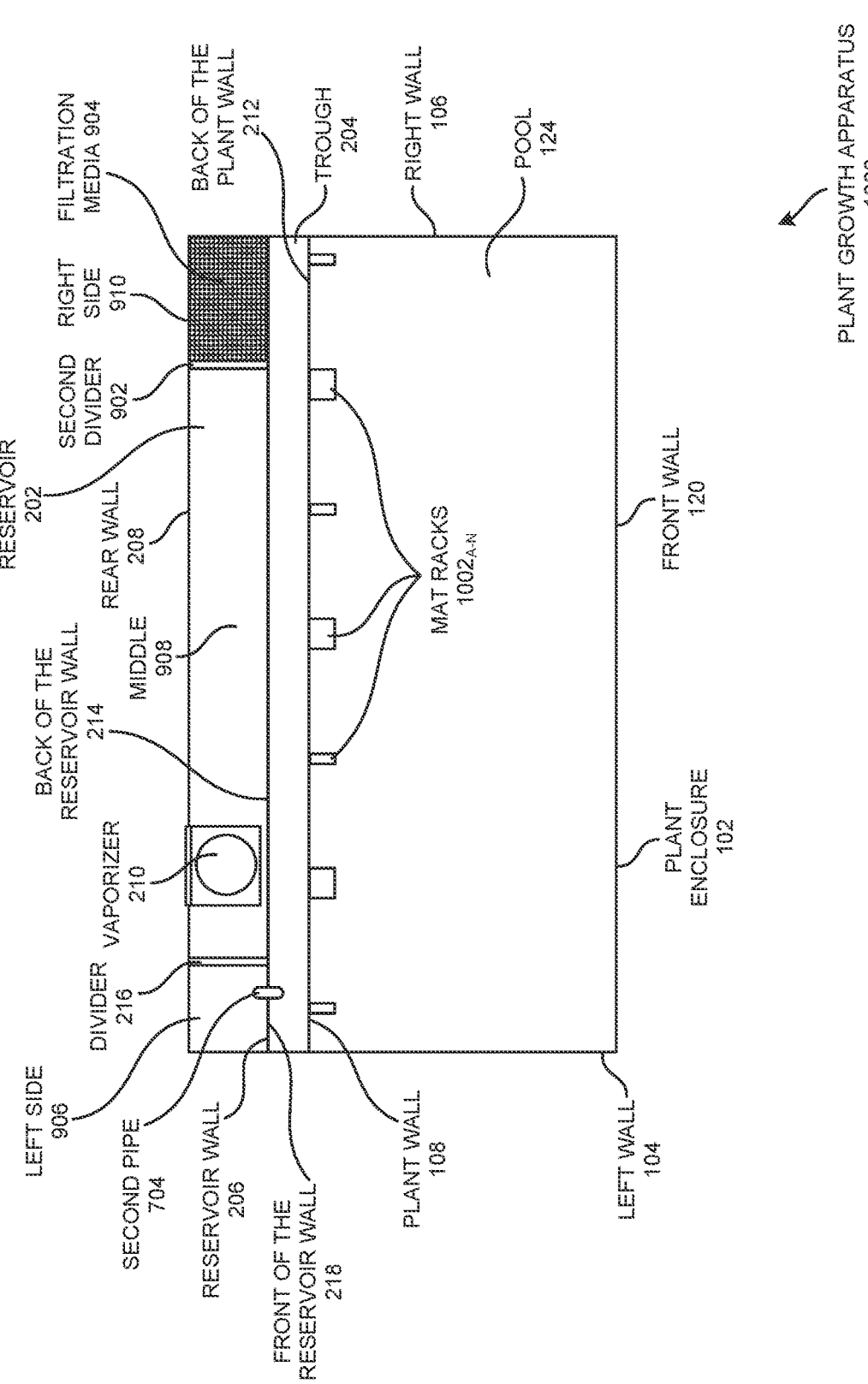
FIG. 11 illustrates a top view of the plant growth apparatus of FIG. 10 wherein the mat racks are attached to the plant wall.

FIG. 11 illustrates a top view of the plant growth apparatus 1000 of FIG. 10 wherein the mat racks 1002$_{A-N}$ are attached to the plant wall 108. Particularly, FIG. 11 incorporates various elements described in the embodiments of the plant growth apparatus 100 of FIGS. 1A & 1B, and alternatively adds the mat racks 1002$_{A-N}$ and the mats 1004$_{A-N}$ attached to the plant wall 108 of the plant growth apparatus 1000 of FIG. 10. The top view of the plant growth apparatus 1000 of FIG. 11 illustrates the arrangement of the mat racks 1002$_{A-N}$ attached to the plant wall 108 when viewed from above. The mat racks 1002$_{A-N}$ may be arranged in an alternate horizontal and vertical positions such that the mats 1004$_{A-N}$ are organized by attaching them to the plant wall 108, according to one embodiment.

Figure 12:
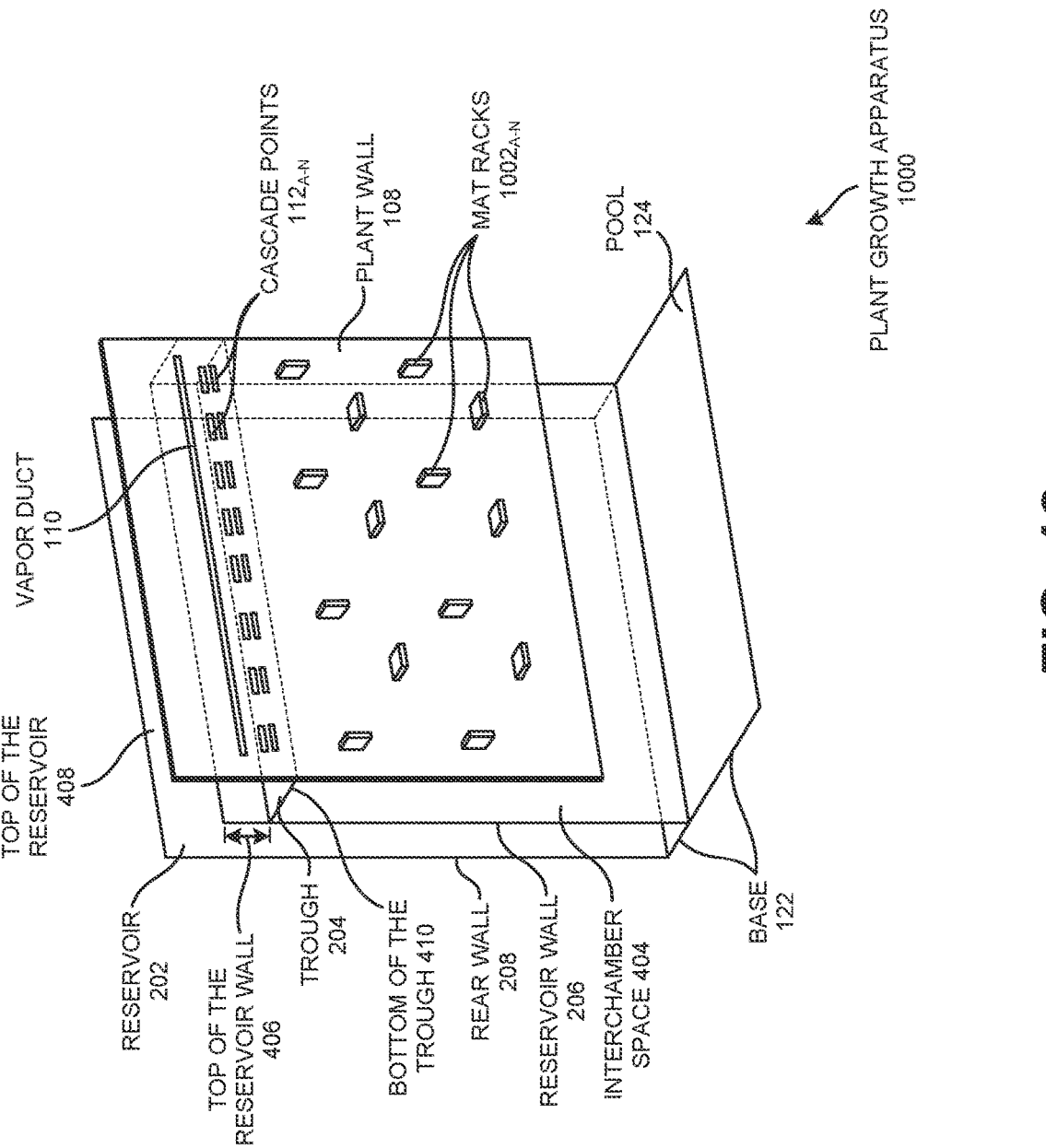
FIG. 12 is an oblique view of the plant growth apparatus of FIG. 10 wherein the left wall, right wall, and front wall are removed.

FIG. 12 is an oblique view of the plant growth apparatus 1000 of FIG. 10 wherein the left wall 104, the right wall 106, and the front wall 120 are removed.

FIG. 12 illustrates the plant wall 108, the vapor duct 110, the cascade points 112$_{A-N}$, the base 122, the pool 124, the reservoir 202, the trough 204, the reservoir wall 206, the rear wall 208, the interchamber space 404, the top of the reservoir wall 406, the top of the reservoir 408, the bottom of the trough 410, and the mat racks 1002$_{A-N}$.

As shown in FIG. 12, the alternate rows of the mat racks 1002$_{A-N}$ may be arranged in horizontal and vertical positions. The arrangement of the mat racks 1002$_{A-N}$ in a horizontal position may support the mats 1004$_{A-N}$ while the vertically positioned the mat racks 1002$_{A-N}$ may orient the mat racks 1002$_{A-N}$ in a uniform and/or sturdy formation. This arrangement of horizontal and vertical rows of the mat racks 1002$_{A-N}$ may allow water to efficiently move down the plant wall 108 through the mats 1004$_{A-N}$(not shown), according to one embodiment.

Figure 13:
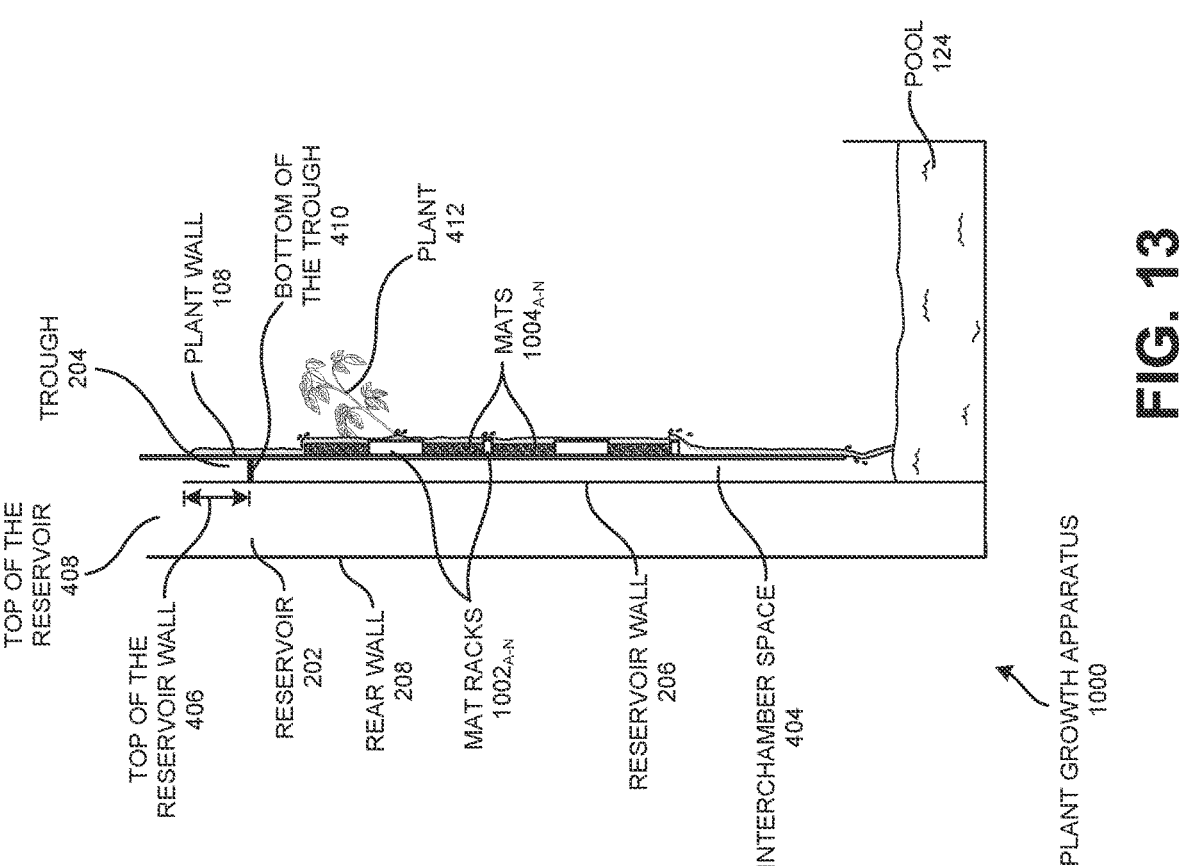
FIG. 13 is a side view of the plant growth apparatus of FIG. 10 illustrating the flow of water from the cascade points, through the mats, and to the pool, according to one embodiment.

FIG. 13 is a side view of the plant growth apparatus 1000 of FIG. 10 illustrating the flow of water from the cascade points 112$_{A-N}$, through the mats 1004$_{A-N}$, and to the pool 124, according to one embodiment. FIG. 13 illustrates the plant wall 108, the pool 124, the reservoir 202, the trough 204, the reservoir wall 206, the rear wall 208, the interchamber space 404, the top of the reservoir wall 406, the top of the reservoir 408, the bottom of the trough 410, the plant 412, the mat racks 1002$_{A-N}$, and the mats 1004$_{A-N}$.

As shown in FIG. 13, the mats 1004$_{A-N}$ may be supported by the mat racks 1002$_{A-N}$. The mats 1004$_{A-N}$ may be attached to the plant wall 108. The mats 1004$_{A-N}$ may be placed within the mat racks 1002$_{A-N}$ such that the mats 1004$_{A-N}$ are against the plant wall 108. The mats 1004$_{A-N}$ may receive a bottom portion of a plant 414 (not shown) and may allow the roots of the plant 412 to grow inside its structure. The mats 1004$_{A-N}$ may form a foundation for healthy root growth by ensuring an appropriate air flow within the mat 1004. The mats 1004$_{A-N}$ may have water retention properties and may accelerate plant growth. The mats 1004$_{A-N}$ may have a fibrous texture to retain the ideal amount of water to support attached plants for healthy root growth. The excess water falling from the cascade points 112$_{A-N}$ of the plant wall 108 that is not retained by the mats 1004$_{A-N}$ may fall down to the pool 124, according to one embodiment.

FIG. 14 is a representative view of the water cycle of the plant growth apparatuses of FIGS. 1-9, according to one embodiment. In step '1' of FIG. 14, the reservoir 202 may fill the trough 204 with water and cause the water to flow through the cascade points 112$_{A-N}$, as described in various embodiments of FIGS. 1-9. In step '2', the cascade points 112$_{A-N}$ may allow passage of water from the trough 204 down along the plant wall 108 to the mounts 114$_{A-N}$. In step '3', the spill throughs 118$_{A-N}$ may allow water to enter the root space 402 after moving down the plant wall 108 from the cascade points 112$_{A-N}$, as described in various embodiments of FIGS. 1-9.

Figure 15:
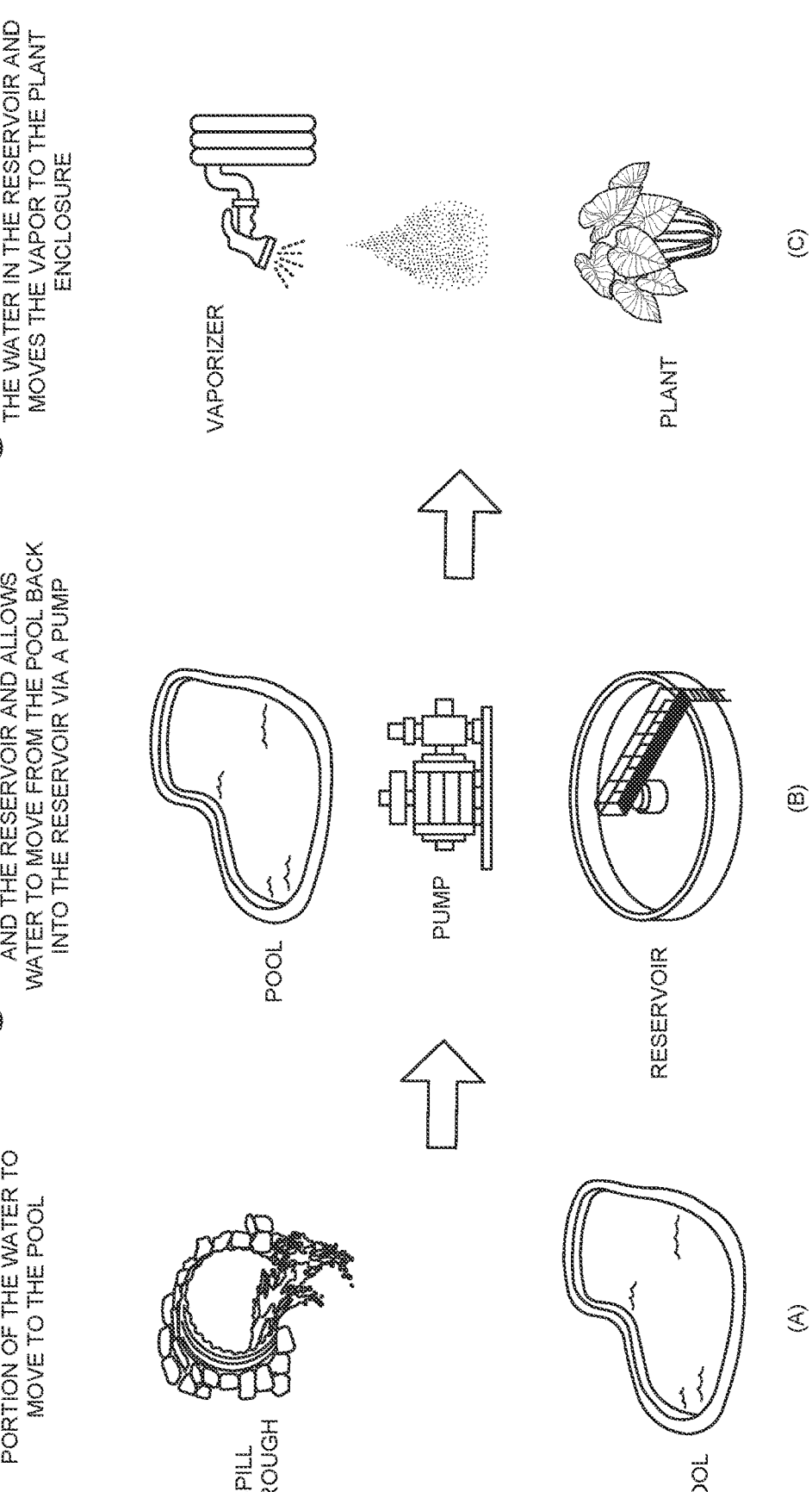
FIG. 15 is a representative view of the water cycle of the plant growth apparatuses of FIGS. 1-9, according to one embodiment.

FIG. 15 is a representative view of the water cycle of the plant growth apparatus 100 of FIGS. 1-9, according to one embodiment. As shown in FIG. 15, step '1' illustrates that the spill throughs 118$_{A-N}$ may allow for a portion of water to move to the pool 124. In step '2', the water return 128 may connect the pool 124 and the reservoir 202 and may allow water to move from the pool 124 back into the reservoir 202 via the pump 132. In step '3', the vaporizer 210 may create vapor from the water in the reservoir 202 and may move the vapor to the plant enclosure 102, as described in various embodiments of FIGS. 1-9.

FIG. 16 is a representative view of the water cycle of the plant growth apparatus of FIGS. 10-13, according to one embodiment. In step '1' of FIG. 16, the reservoir 202 may fill the trough 204 with water and cause the water to flow through the cascade points 112$_{A-N}$. In step '2', the cascade points 112$_{A-N}$ may allow passage of water from the trough 204 down the plant wall 108 to the mats 1004$_{A-N}$. In step '3', the mats 1004$_{A-N}$ may be formed to allow water to reach the roots of a plant while moving down from the cascade points 112$_{A-N}$, as described in various embodiments of FIGS. 10-13.

Figure 17:
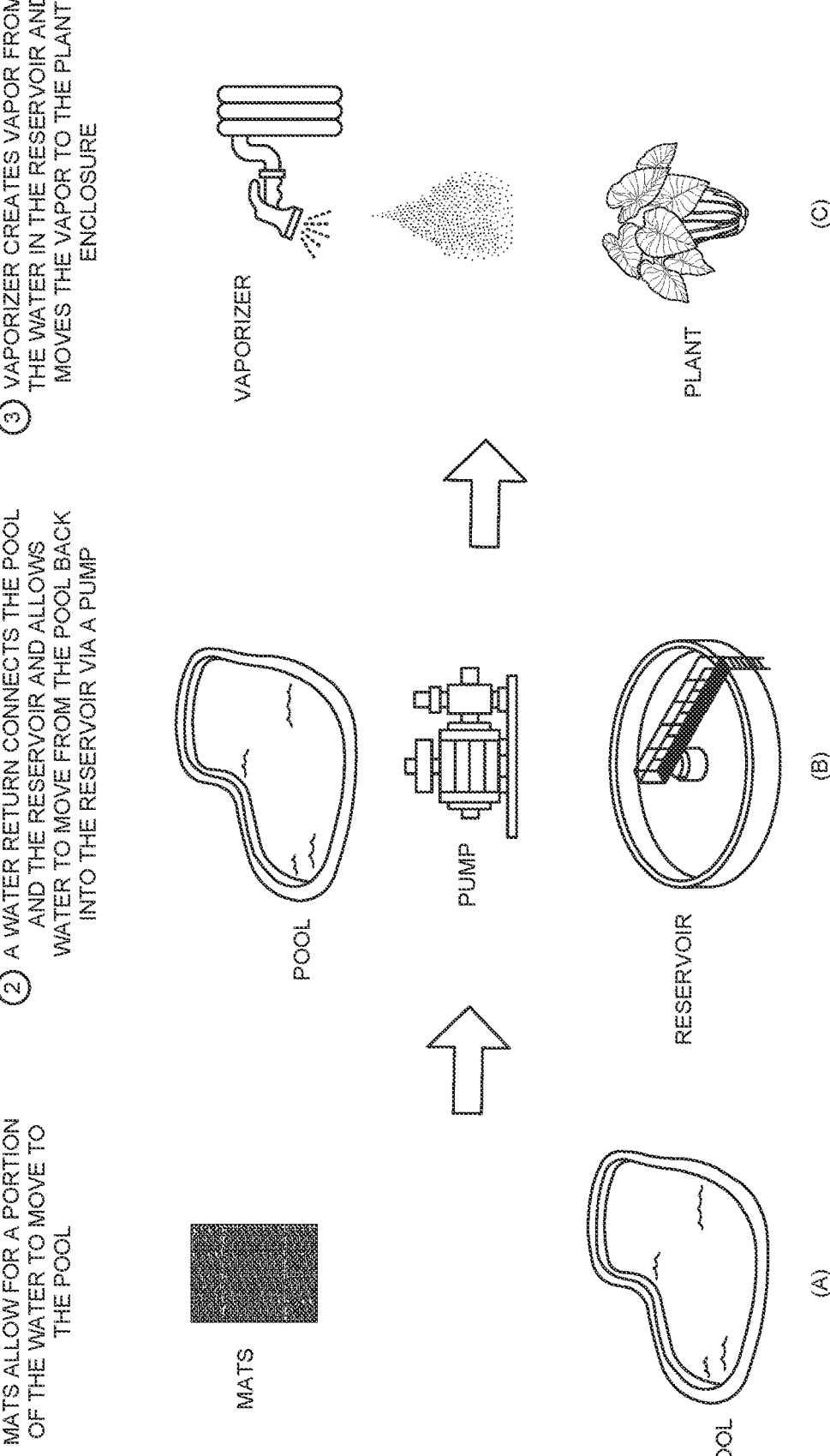
FIG. 17 is a representative view of the water cycle of the plant growth apparatus of FIGS. 10-13, according to one embodiment.

FIG. 17 is a representative view of the water cycle of the plant growth apparatus of FIGS. 10-13, according to one embodiment. In step '1' of FIG. 17, the mats 1004$_{A-N}$ may allow for a portion of the water to move to the pool 124. In step '2', the water return 128 may connect the pool 124 and the reservoir 202 and allow the water to move from the pool 124 back into the reservoir 202 via the pump 132. In step '3', the vaporizer 210 may create vapor from the water in the reservoir 202 and move the vapor to the plant enclosure 102 via the vapor duct 110, as described in various embodiments of FIGS. 10-13.

Figure 18:
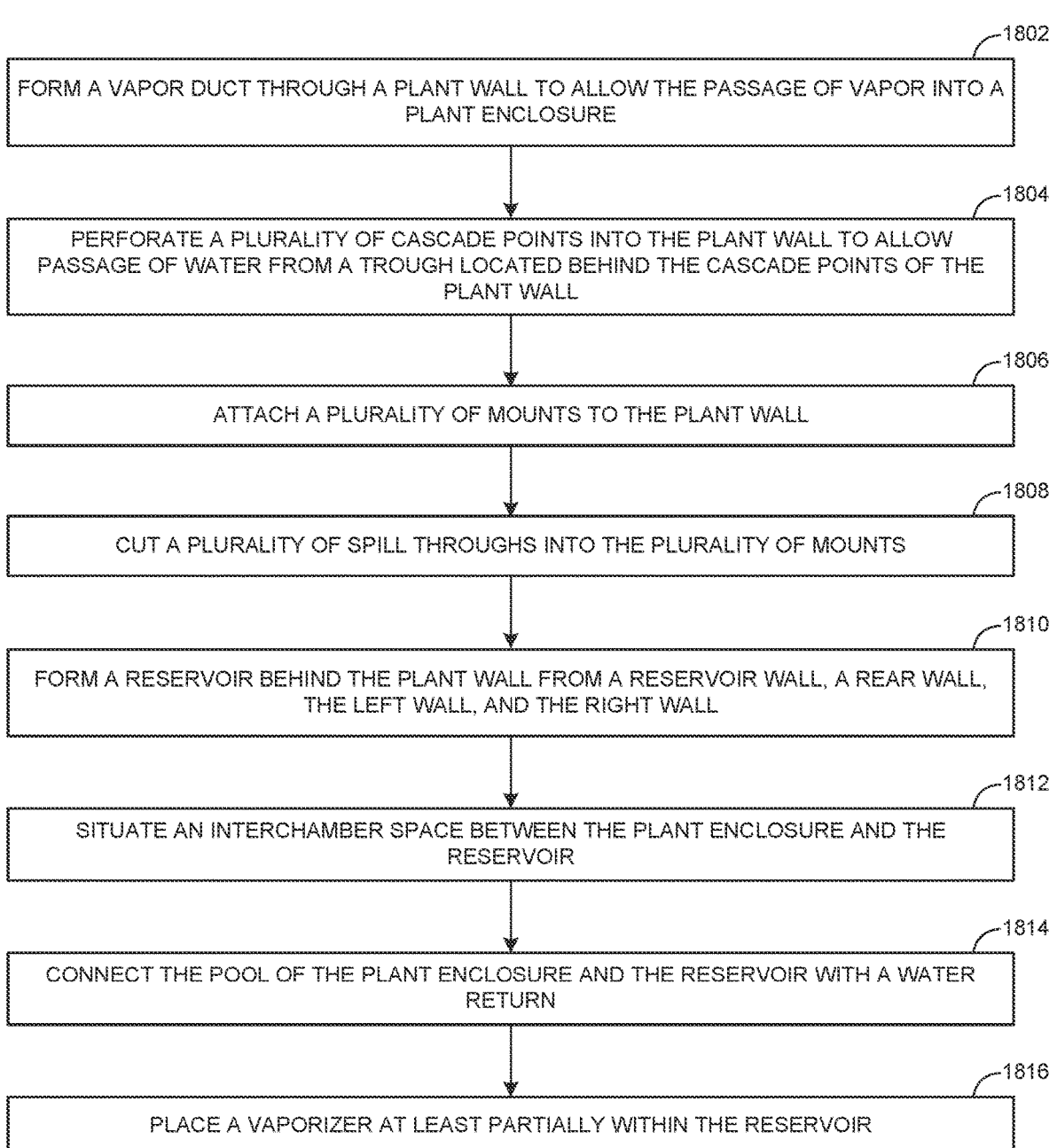
FIG. 18 is a process flow diagram describing the method of forming a plant growth apparatus, according to one embodiment.

FIG. 18 illustrates a process flow diagram describing the method of forming a plant growth apparatus, according to one embodiment. In operation 1802, a vapor duct may be formed through a plant wall to allow the passage of vapor into a plant enclosure. In operation 1804, a plurality of cascade points may be perforated into the plant wall to allow passage of water from a trough located behind the cascade points of the plant wall. In operation 1806, a plurality of mounts may be attached to the plant wall. In operation 1808, a plurality of spill throughs may be cut into the plurality of mounts. In operation 1810, a reservoir may be formed behind the plant wall from a reservoir wall, a rear wall, the left wall, and the right wall. In operation 1812, an interchamber space may be situated between the plant enclosure and the reservoir. In operation 1814, the pool of the plant enclosure may be connected to the reservoir with a water return. In operation 1816, a vaporizer may be placed at least partially within the reservoir.

The embodiments of FIGS. 1-18 may remedy the problems associated with existing plant growth apparatuses. The embodiments of FIGS. 1-18 may lessen the footprint of plant growth apparatuses while enhancing the growing conditions for plants. The embodiments of FIGS. 1-18 may produce healthier and/or more robust plants while also lessening the need for cleaning within the apparatus. The embodiments of FIGS. 1-18 may allow for the growth and cultivation of several different plant types without the need for an exorbitant amount of equipment and water. Furthermore, the embodiments of FIGS. 1-18 may provide an easier means to grow plants for hobbyists and business owners alike.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. A plant growth apparatus comprising:
a plant enclosure defined by a plant wall, a left wall, a right wall, and a front wall;
a vapor duct extending through an upper portion of the plant wall and configured to allow vapor to pass into the plant enclosure;
a plurality of cascade points formed through the plant wall below the vapor duct, the cascade points configured to allow water to pass from a trough positioned behind the plant wall into the plant enclosure;
a plurality of mounts attached to a front surface of the plant wall inside the plant enclosure,
   wherein each mount includes a plant receiver configured to hold a plant, and
   wherein the mounts and the plant wall define a root space therebetween configured to receive roots of the plants;
a plurality of spill throughs openings formed in the mounts and configured to allow water flowing downward along the plant wall from the cascade points to enter the root space and to further pass into a pool located below the mounts;
a reservoir located behind the plant wall formed from a reservoir wall, a rear wall, the left wall, and the right wall,
   wherein the trough is situated between the plant wall and the reservoir wall and configured to receive water from the reservoir and distribute the water through the cascade points;
an interchamber space situated between the plant enclosure and the reservoir and formed from the left wall, the right wall, a back of the plant wall, a front of the reservoir wall, and a bottom of the trough;

the pool located at a bottom portion of the plant enclosure and configured to collect water flowing from the mounts;

a water return connecting the pool of the plant enclosure and the reservoir;

a pump configured to move water from the pool to the reservoir through the water return; and a vaporizer located at least partially within the reservoir and configured to generate vapor from water contained in the reservoir and deliver the vapor through the vapor duct into the plant enclosure.

2. The plant growth apparatus of claim 1, wherein the pool is formed from a base, the left wall, the right wall, the rear wall, and the front wall of the plant enclosure.

3. The plant growth apparatus of claim 1, wherein the trough is attached to the back of the plant wall below a top of the reservoir wall.

4. The plant growth apparatus of claim 1, wherein the trough is attached to the back of the plant wall at the top of the reservoir wall.

5. The plant growth apparatus of claim 1 further comprising:

at least one divider located in the reservoir, wherein the at least one divider creates at least two chambers within the reservoir.

6. The plant growth apparatus of claim 5 wherein at least one of the at least two chambers within the reservoir is implanted with a filtration media.

7. The plant growth apparatus of claim 1, wherein the plurality of mounts are oriented against the plant wall at an angle between 10 degrees and 70 degrees.

8. The plant growth apparatus of claim 1, further comprising:

a plurality of apertures cut into the plant wall adjacent to the root space of the mounts and the plurality of plant receivers, wherein the plurality of apertures receive a bottom portion of the plant.

9. The plant growth apparatus of claim 8, wherein the apertures are formed in an oval shape.

10. The plant growth apparatus of claim 1, wherein the plurality of cascade points comprises an upper slit and a lower slit, wherein the upper slit is an opening in the plant wall above the mounts that is longer a width than a height, and wherein the lower slit is the opening in the plant wall that is longer in the width than the height and is located above the plurality of mounts and below the upper slit.

11. The plant growth apparatus of claim 10 wherein at least one of the lower slits comprises a curved notch on a bottom edge of the lower slit.

12. The plant growth apparatus of claim 1 further comprising:

an internal filter within the interchamber space comprising the pump, wherein the pump moves water from the pool to the filter via a first pipe, and wherein the pump moves the filtered water through a second pipe into a top of the reservoir.

13. The plant growth apparatus of claim 1 further comprising:

a second pool formed from the left wall, the right wall, the reservoir wall, and a partition, wherein the second pool is elevated above the pool, wherein the partition separates the second pool from the pool, and wherein the partition comprises at least one drainage point comprising a filtration screen to filter water draining from the second pool into the pool.

14. The plant growth apparatus of claim 13 further comprising:

at least one pool stand, wherein the pool stand comprises at least one leg and a plurality of second plant receivers, and wherein the pool stand allows the plant to be at least partially submerged within the pool when in the second plant receiver.

15. A plant growth apparatus comprising:

a plant enclosure formed from a plant wall, a left wall, a right wall, and a front wall;

a plurality of vapor ducts formed through the plant wall to allow the passage of vapor into the plant enclosure, wherein the vapor ducts are longer in a width than a height;

a plurality of cascade points perforated into the plant wall to allow passage of water from a trough located behind the cascade points of the plant wall, wherein the plurality of cascade points comprise a plurality of upper slits and a plurality of lower slits, wherein the upper slits are longer in the width than the height and the lower slits are longer in the width than the height, and wherein the lower slits comprise a curved notch on a bottom edge of the lower slit;

a plurality of mounts horizontally attached to the plant wall comprising a plurality of plant receivers, wherein plants are inserted at an angle between 10 degree and 75 degrees;

a plurality of spill throughs cut into the plurality of mounts, wherein the plurality of spill throughs allow water to enter a root space of the plurality of mounts, and wherein the plurality of spill throughs are longer in the width than the height;

a reservoir formed from a reservoir wall, a rear wall, the left wall, and the right wall, wherein the reservoir fills the trough with water and causes the water to flow through the cascade points, wherein the water flows from the cascade points down the plant wall, wherein the water flows down the plant wall through the spill throughs, wherein the water flows through the spill throughs into a pool, wherein the pool is formed from the left wall, the right wall, the plant wall, and the front wall of the plant enclosure, and wherein the reservoir is divided into a left side, a middle, and a right side by a divider and a second divider;

an interchamber space formed from the left wall, the right wall, a back of the plant wall, a front of reservoir wall, and a bottom of the trough, wherein the trough is attached to the back of the plant wall and the front of the reservoir wall, and wherein the trough is below a top of the reservoir wall;

a water return connecting the pool of the plant enclosure and the reservoir, wherein the water return allows water to move from the pool back into the reservoir via a pump, wherein the pump moves water from the pool to a filtration system located in the interchamber space through a first pipe, and wherein the pump moves cleaned water from the filtration system through a second pipe to a top of the reservoir;

a vaporizer located at least partially within the reservoir, wherein the vaporizer creates vapor from the water in the reservoir, and wherein the vapor moves through the vapor ducts to the plant enclosure;

a second pool formed from the left wall, the right wall, the reservoir wall, and a partition, wherein the second pool is elevated above the pool, wherein the partition separates the second pool from the pool, and wherein the partition comprises at least one drainage point comprising a filtration screen to filter water draining from the second pool into the pool, at least one pool stand within the pool, wherein the pool stand comprises at least two legs and a plurality of second plant receivers, and wherein the pool stand allows a plant to be at least partially submerged within the pool when in the second plant receiver; and a plurality of apertures cut into the plant wall adjacent to the root space of the mounts and the plurality of plant receivers, wherein the plurality of apertures receive a bottom portion of the plant, wherein the bottom portion of the plant extends into the interchamber space, and wherein the apertures are oval shaped.

16. The plant growth apparatus of claim 15 wherein the vaporizer is at least partially in at least one of the left side of the reservoir, the right side of the reservoir, and the middle of the reservoir.

17. The plant growth apparatus of claim 15 further comprising:

a filtration media implanted in at least one of the left side of the reservoir, the right side of the reservoir, and the middle of the reservoir.

18. A plant growth apparatus comprising:

a plant enclosure formed from a plant wall, a left wall, a right wall, and a front wall;

a vapor duct formed through the plant wall to allow the passage of vapor into the plant enclosure, wherein the vapor duct is longer in a width than a height;

a plurality of cascade points perforated into the plant wall to allow passage of water from a trough located behind the cascade points of the plant wall, wherein the plurality of cascade points comprise a plurality of upper slits and a plurality of lower slits, wherein the upper slits are longer in the width than the height and the lower slits are longer in the width than the height, and a plurality of mat racks attached to the plant wall, wherein each mat rack of the plurality of mat racks support at least one mat against the plant wall;

a reservoir formed from a reservoir wall, a rear wall, the left wall, and the right wall, wherein the reservoir fills the trough with water and causes the water to flow through the cascade points, wherein the water flows from the cascade points down along the plant wall, wherein the water flows down the plant wall into a pool, wherein the pool is formed from the left wall, the right wall, the plant wall, and the front wall of the plant enclosure, and wherein the reservoir is divided into a left side, a middle, and a right side by a divider and a second divider;

an interchamber space formed from the left wall, the right wall, a back of the plant wall, a front of reservoir wall, and a bottom of the trough, wherein the trough is attached to the back of the plant wall and the front of the reservoir wall, and wherein the trough is below a top of the reservoir wall;

a water return connecting the pool of the plant enclosure and the reservoir, wherein the water return allows water to move from the pool back into the reservoir via a pump, wherein the pump moves water from the pool to a filtration system located in the interchamber space through a first pipe, and wherein the pump moves cleaned water from the filtration system through a second pipe to a top of the reservoir; and a vaporizer located at least partially within the reservoir, wherein the vaporizer creates vapor from the water in the reservoir, and wherein the vapor moves through the vapor ducts to the plant enclosure.

19. A method of forming a plant growth apparatus comprising:

forming a vapor duct through a plant wall to allow the passage of vapor into a plant enclosure, wherein the vapor duct is situated at a top portion of the plant wall, and wherein the plant wall, a right wall, a left wall, and a front wall forms the plant enclosure;

perforating a plurality of cascade points into the plant wall to allow passage of water from a trough located behind the cascade points of the plant wall, wherein the cascade points are positioned below the vapor duct;

attaching a plurality of mounts to the plant wall, wherein a plurality of plant receivers are cut into the plurality of mounts forming a root space, wherein plants are set into the plurality of plant receivers of the mounts, and wherein roots of the plants occupy the root space formed by the plant wall and the mounts;

cutting a plurality of spill throughs into the plurality of mounts, wherein the plurality of spill throughs allow water to enter the root space after moving down along the plant wall from the cascade points, and wherein the plurality of spill throughs allow for a portion of the water to move to a pool below the plurality of mounts;

forming a reservoir behind the plant wall from a reservoir wall, a rear wall, the left wall, and the right wall, wherein the trough is situated between the plant wall and the reservoir wall, wherein the reservoir is located behind the trough, and wherein the reservoir fills the trough with water by spilling water over the reservoir wall into the trough causing the water to flow through the cascade points;

situating an interchamber space between the plant enclosure and the reservoir, wherein the interchamber space is formed from the left wall, the right wall, a back of the plant wall, a front of the reservoir wall, and a bottom of the trough, and wherein the trough is attached to at least one of the back of the plant wall and the front of the reservoir wall, connecting the pool of the plant enclosure and the reservoir with a water return, wherein the water return allows water to move from the pool back into the reservoir via a pump; and placing a vaporizer at least partially within the reservoir, wherein the vaporizer creates vapor from the water in the reservoir, and wherein the vapor moves through the vapor duct to the plant enclosure.

20. The method of claim 19 further comprising:

implanting a filtration media into the reservoir to filter water as it is returned into the reservoir from the pool via the pump.

\* \* \* \* \*